(12) United States Patent
Seok et al.

(10) Patent No.: US 11,963,097 B2
(45) Date of Patent: Apr. 16, 2024

(54) EXTREME-HIGH-THROUGHPUT ENHANCED SUBCHANNEL SELECTIVE TRANSMISSION OPERATION IN WIRELESS COMMUNICATIONS

(71) Applicant: MediaTek Singapore Pte. Ltd., Singapore (SG)

(72) Inventors: Yongho Seok, San Jose, CA (US); Hung-Tao Hsieh, Hsinchu (TW); Jianhan Liu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 275 days.

(21) Appl. No.: 17/315,552

(22) Filed: May 10, 2021

(65) Prior Publication Data

US 2021/0360521 A1    Nov. 18, 2021

Related U.S. Application Data

(60) Provisional application No. 63/025,242, filed on May 15, 2020, provisional application No. 63/023,911, filed on May 13, 2020.

(51) Int. Cl.
*H04W 52/02* (2009.01)
*H04L 1/1607* (2023.01)
*H04W 74/0816* (2024.01)

(52) U.S. Cl.
CPC ....... *H04W 52/0203* (2013.01); *H04L 1/1614* (2013.01); *H04W 52/0216* (2013.01); *H04W 74/0816* (2013.01)

(58) Field of Classification Search
None
See application file for complete search history.

(56) References Cited

U.S. PATENT DOCUMENTS

2018/0132175 A1   5/2018  Choi et al.
2019/0159245 A1   5/2019  Park et al.
(Continued)

FOREIGN PATENT DOCUMENTS

CN          107743721 A      2/2018
WO     WO 2020085997 A1     4/2020

OTHER PUBLICATIONS

European Patent Office, Extended European Search Report for European Patent Application No. 22158788.4, dated Jun. 30, 2022.
(Continued)

*Primary Examiner* — Alex Skripnikov
(74) *Attorney, Agent, or Firm* — Han IP PLLC; Andy M. Han

(57) ABSTRACT

Communications between an access point (AP) and a non-AP station (STA) are established in a plurality of frequency segments within a basic service set (BSS) bandwidth or on at least a first link and a second link. An extreme-high-throughput (EHT) subchannel selective transmission (SST) operation is performed between the AP and the non-AP STA in the plurality of frequency segments or on the first link and the second link. A trigger-enabled target wake time (TWT) session period (SP) for the EHT SST operation by either indicating one of the plurality of frequency segments as containing a resource unit (RU) allocation addressed to the non-AP STA or indicating one of the first link and the second link on which an operating frequency segment is located during the TWT SP.

16 Claims, 15 Drawing Sheets

(56) References Cited

U.S. PATENT DOCUMENTS

| | | |
|---|---|---|
| 2019/0215884 A1 | 7/2019 | Patil et al. |
| 2019/0246354 A1 | 8/2019 | Huang et al. |
| 2020/0107393 A1 | 4/2020 | Chu et al. |
| 2020/0383156 A1 | 12/2020 | Seok et al. |
| 2021/0007168 A1 | 1/2021 | Asterjadhi et al. |
| 2021/0360522 A1* | 11/2021 | Chitrakar .......... H04W 52/0206 |

OTHER PUBLICATIONS

Seok et al. (Mediatek); "Multi-link Spatial Multiplexing"; IEEE Draft; 11-20-0883-00-00BE-Multi-Link-Spatial-Multiplexing; IEEE-SA Mentor; Piscataway, NJ, USA; Jul. 2, 2020.

Park et al. )Intel Corp); "Enhanced Multi-Link Single Radio Operation"; IEEE Draft; 11-20-0562-01-00BE-Enhanced-Multi-Link-Single-Radio-Operation; IEEE-SA Mentor; Piscataway, NJ, USA; May 15, 2020.

Song et al. (LG Electronics); "RTS/CTS for multi-link"; IEEE Draft; 11-20-0430-00-00BE-RTS-CTS-For-Multi-Link; IEEE-SA Mentor; Piscataway, NJ, USA; Mar. 23, 2020.

Kim et al.; "Minutes for TGbe MAC Ad-Hoc teleconferences in Nov. 2020 and Jan. 2021"; IEEE Draft; 11-20-1765-14-00Be-Minutes-For-TGbe-MAC-Ad-Hoc-Teleconferences-In-Nov-2020-And-Jan. 2021; IEEE-SA Mentor; Piscataway, NJ, USA; Jan. 14, 2021.

Taiwan Intellectual Property Office, Office Action for Taiwan Patent Application No. 110117257, dated Feb. 15, 2022.

European Patent Office, Extended European Search Report for European Patent Application No. 21173361.3, dated Oct. 27, 2021.

Taiwan Intellectual Property Office, Office Action for Taiwan Patent Application No. 111106975, dated Nov. 3, 2022.

China National Intellectual Property Administration, First Office Action in China Patent Application No. 202110521249.7, dated Jun. 15, 2023.

* cited by examiner

TWT Element Format (A)

| Element ID | Length | Control | TWT Parameter Information |
|---|---|---|---|
| 1 | 1 | 1 | Variable |

Octets

600

Control Field Format (B)

| B0 | B1 | B2 – B3 | B4 | B5 | B6 | B7 |
|---|---|---|---|---|---|---|
| NDP Paging Indicator | Responder PM Mode | Negotiation Type | TWT Information Frame Disabled | Wake Duration Unit | TWT Channel Length | Reserved |
| 1 | 1 | 2 | 1 | 1 | 2 | 2 |

Bits

FIG. 6

EXTREME-HIGH-THROUGHPUT ENHANCED SUBCHANNEL SELECTIVE TRANSMISSION OPERATION IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/023,911 and 63/025,242, filed on 13 May 2020 and 15 May 2020, respectively, the contents of which being incorporated by reference in their entirety.

TECHNICAL FIELD

The present disclosure is generally related to wireless communications and, more particularly, to extreme-high-throughput (EHT) enhanced subchannel selective transmission (SST) operation in wireless communications.

BACKGROUND

Unless otherwise indicated herein, approaches described in this section are not prior art to the claims listed below and are not admitted as prior art by inclusion in this section.

In a wireless local area network (WLAN) according to the Institute of Electrical and Electronics Engineers (IEEE) 802.11 specifications, a 20-MHz-only non-access point (non-AP) high-efficiency (HE) station (STA) is a non-AP HE STA that indicates in a Supported Channel Width Set subfield in the HE physical layer (PHY) Capabilities Information field of the HE Capabilities element transmitted by the STA that the STA supports for only 20-MHz channel width for a frequency band in which the STA is operating. A 20-MHz operating non-AP HE STA is a non-AP HE STA that is operating in a 20-MHz channel width mode, such as a 20-MHz-only non-AP HE STA or a HE STA that reduced its operating channel width to 20 MHz using operating mode indication (OMI). A 20-MHz operating non-AP HE STA is to operate in a primary 20-MHz channel except when the 20-MHz operating non-AP STA is a 20-MHz-only non-AP HE STA with dot11HESubchannelSelective-Transmission-Implemented equal to true. In such a case, the 20-MHz-only non-AP HE STA can operate in any 20-MHz channel within a basic service set (BSS) bandwidth by following a pre-defined procedure for HE SST. However, in case a 20-MHz operating non-AP HE STA is the receiver of a 40-MHz, 80-MHz, 80+80-MHz or 160-MHz HE multi-user (MU) Physical Layer Convergence Protocol (PLCP) Protocol Data Unit (PPDU) or the transmitter of a 40-MHz, 80-MHz, 80+80-MHz or 160-MHz HE trigger-based (TB) PPDU, then a resource unit (RU) tone mapping in a 20-MHz band would not be aligned with 40-MHz, 80-MHz, 80+80-MHz or 160-MHz RU tone mapping.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT enhanced SST operation in wireless communications. Under various proposed schemes in accordance with the present disclosure, issues described herein may be addressed. For instance, an EHT SST operation by a 20-MHz operating STA, an 80-MHz operating STA and a 160-MHz operating STA in an EHT 320-MHz BSS may be supported by implementing various schemes proposed herein.

In one aspect, a method may involve establishing communications between an AP and a non-AP STA in a plurality of frequency segments within a BSS bandwidth. The method may also involve performing an EHT SST operation in the plurality of frequency segments by: (a) negotiating a trigger-enabled target wake time (TWT) session period (SP) by indicating one of the plurality of frequency segments as containing a resource unit (RU) allocation addressed to the non-AP STA; (b) performing a first data transmission in a first frequency segment of the plurality of frequency segments prior to the TWT SP; (c) switching to a second frequency segment of the plurality of frequency segments to perform a second data transmission on a second link during the TWT SP; and (d) switching back to the first frequency segment to perform a third data transmission on a first link after the TWT SP.

In another aspect, a method may involve establishing communications between an AP and a non-AP STA on at least a first link and a second link. The method may also involve performing an EHT multi-link SST operation on the first link and the second link by: (a) negotiating a trigger-enabled TWT SP by indicating one of the first link and the second link on which an operating frequency segment is located during the TWT SP; (b) performing a first data transmission on the first link prior to the TWT SP; (c) switching to the second link to perform a second data transmission on the second link during the TWT SP; and (d) switching back to the first link to perform a third data transmission on the first link after the TWT SP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example design in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT enhanced SST operation in wireless communications. According to the present disclosure, a number of possible solutions may be implemented separately or jointly. That is, although these possible solutions may be described below separately, two or more of these possible solutions may be implemented in one combination or another.

Figure 1:
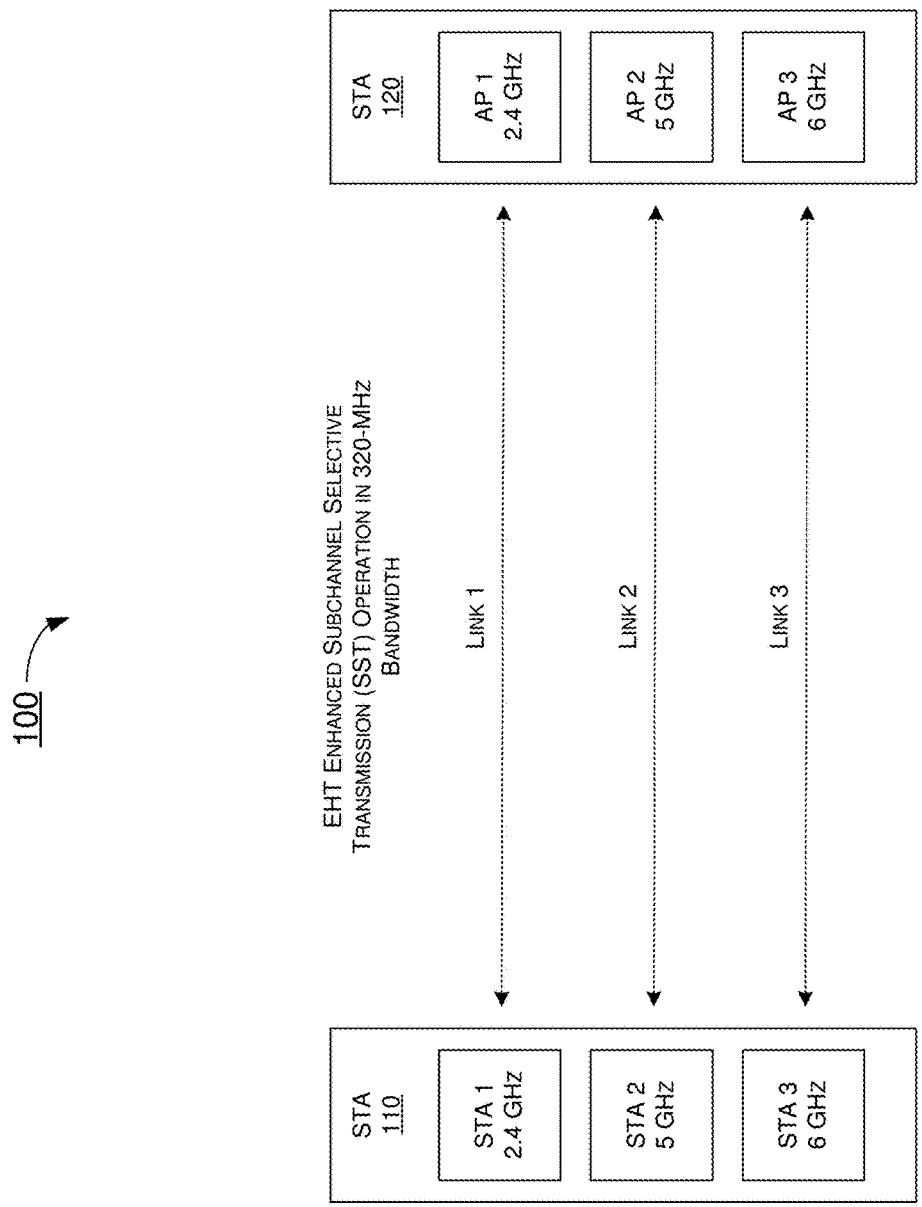
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve a STA 110 and a STA 120 communicating wirelessly over multiple links (e.g., link 1, link 2 and link 3), or in multiple frequency segments, in accordance with one or more Institute of Electrical and Electronics Engineers (IEEE) 802.11 standards such as IEEE 802.11 be and beyond. Each of STA 110 and STA 120 may function as an MLD. For instance, STA 110 may function as a non-AP MLD with multiple virtual STAs (e.g., STA 1, STA 2 and STA 3) operating within STA 110. Correspondingly, STA 120 may function as an AP MLD with multiple virtual APs (e.g., AP 1, AP 2 and AP 3) operating within STA 120. For instance, in implementing various proposed schemes described herein, STA 110 may function as an HE SST non-AP STA, an EHT single-radio SST non-AP STA or an EHT multi-link SST non-AP STA. Correspondingly, in implementing various proposed schemes described herein, STA 120 may function as an HE SST AP or an EHT multi-link SST AP. Under various proposed schemes in accordance with the present disclosure, STA 110 and STA 120 may be configured to perform EHT enhanced SST operation in wireless communications according to various proposed schemes described herein.

Under current IEEE specification, with respect to 20-MHz operating non-AP HE STAs, a HE AP operating in a 5-GH frequency band or a 6-GHz frequency band may be able to interoperate with non-AP HE STAs, regardless of the indicated value of B1 in the Supported Channel Width Set subfield in the HE PHY Capabilities Information field in the HE Capabilities element. A 20-MHz operating non-AP HE STA may support tone mapping of 26-tone RU, 52-tone RU, 106-tone RU and 242-tone RU for a 20-MHz HE PPDU in the 2.4-GHz and 5-GHz frequency bands. A 20-MHz operating non-AP HE STA may indicate support of tone mapping of 26-tone RU, 52-tone RU and 106-tone RU for a 40-MHz HE PPDU in the 2.4-GHz frequency band and using 20 MHz in 40-MHz HE PPDUs in the 2.4-GHz Band subfield in the HE PHY Capabilities Information field in the HE Capabilities element with the exception of RUs that are restricted from operation. Additionally, a 20-MHz operating non-AP HE STA may support tone mapping of 26-tone RU, 52-tone RU and 106-tone RU for 40-MHz HE PPDUs in the 5-GHz frequency band, as well as for 80-MHz HE PPDUs in the 5-GHz and 6-GHz frequency bands with the exception of RUs that are restricted from operation. Moreover, a 20-MHz operating non-AP HE STA may indicate support of tone mapping of 26-tone RU, 52-tone RU and 106-tone RU for 80+80-MHz and 160-MHz HE PPDUs using 20 MHz in 160/80+80-MHz HE PPDU subfield in the HE PHY Capabilities Information field in the HE Capabilities element with the exception of RUs that are restricted from operation. Furthermore, a 20-MHz operating non-AP HE STA may support tone mapping of 242-tone RU for the reception of 40-MHz HE PPDUs in the 2.4-GHz, 5-GHz and 6-GHz frequency bands, as well as 80-MHz, 80+80-MHz and 160-MHz HE MU PPDUs in the 5-GHz and 6-GHz frequency bands. This support may be indicated in the Supported Channel Width Set subfield in the HE PHY Capabilities Information field of the HE Capabilities element.

With respect to RU restrictions for 20-MHz operations, an AP may not assign certain RUs to a 20-MHz operating non-AP HE STA where the RU index is defined in Table 27-8 of the IEEE specification regarding data and pilot subcarrier indices for RUs in a 40-MHz HE PPDU. Such RUs may include at least 26-tone RU 5 and 14 of a 40-MHz HE MU PPDU and HE TB PPDU. Also, an AP may not assign certain RUs to a 20-MHz operating non-AP HE STA where the RU index is defined in Table 27-9 of the IEEE specification regarding data and pilot subcarrier indices for RUs in an 80-MHz HE PPDU. Such RUs may include at least 26-tone RU 5, 10, 14, 19, 24, 28 and 33 of an 80-MHz HE MU PPDU and HE TB PPDU, 26-tone RU 5, 10, 14, 19, 24, 28 and 33 of the lower 80 MHz of an 80+80-MHz and 160-MHz HE MU PPDU and HE TB PPDU, and 26-tone RU 5, 10, 14, 19, 24, 28 and 33 of the upper 80 MHz of an 80+80-MHz HE MU PPDU and HE TB PPDU.

With respect to 80-MHz operating non-AP HE STAs, a non-AP HE STA capable of up to 80-MHz channel width, when operating with 80-MHz channel width, may indicate support of reception of 160-MHz or 80+80-MHz HE MU PPDUs or the transmission of 160-MHz or 80+80-MHz HE TB PPDUs in the 80 MHz in the 160/80+80-MHz HE PPDU subfield in the HE PHY Capabilities Information field in the HE Capabilities element. An HE AP STA may not allocate RUs outside of the primary 80 MHz when allocating an RU in a 160-MHz or 80+80-MHz HE MU PPDU or HE TB PPDU to a non-AP HE STA that sets the 80 MHz in 160/80+80-MHz HE PPDU subfield in the HE PHY Capabilities Information field in the HE Capabilities element to 1 and is operating in an 80-MHz channel width mode.

With respect to HE SST, an HE STA that supports HE SST operation may set dot11HESubchannelSelectiveTransmissionImplemented to true and may set the HE Subchannel Selective Transmission Support field in the HE Capabilities element it transmits to 1. An HE STA that does not support HE SST operation may set the HE Subchannel Selective Transmission Support field in the HE Capabilities element it transmits to 0. An HE non-AP STA with dot11HESubchannelSelectiveTransmissionImplemented set to true may be an HE SST STA. An HE AP with dot11HESubchannelSelectiveTransmissionImplemented set to true may be an HE SST AP. An HE SST STA may set up SST operation by negotiating a trigger-enabled TWT as defined in Section 26.8.2 (Individual TWT agreements) of the IEEE specification with some exceptions. A first exception may be that the TWT Request may have a TWT Channel field with up to one bit set to 1 to indicate which of the secondary channels is requested to contain the RU allocations addressed to the HE SST STA that is a 20-MHz operating STA. A second exception may be that the TWT Request may have a TWT Channel field with all four least-significant bits (LSBs) or all four most-significant bits (MSBs) set to 1 to indicate whether the primary 80-MHz channel or the secondary 80-MHz channel is requested to contain the RU allocations addressed to the HE SST STA that is an 80-MHz operating STA. A third exception may be that the TWT Response may have a TWT Channel field with up to one bit set to 1 to indicate which of the secondary channels would contain the RU allocations addressed to the HE SST STA that is a 20-MHz operating STA. A fourth exception may be that the TWT Response may have a TWT Channel field with all the four LSBs or all the four MSBs to indicate whether the primary 80-MHz channel or the secondary 80-MHz channel would contain the RU allocations addressed to the HE SST STA that is an 80-MHz operating STA.

Moreover, with respect to HE SST, an HE SST STA that successfully sets up SST operation may need to follow certain rules. Also, the HE SST AP may follow the rules defined in Section 26.8.2 (Individual TWT agreements) of the IEEE specification to exchange frames with the HE SST STA during negotiated trigger-enabled TWT SPs with some exceptions. One exception may be that the AP may need to ensure that the RUs allocated in DL MU PPDUs and in Trigger frames addressed to the SST STA are within the subchannel indicated in the TWT Channel field of the TWT Response and follows the RU restriction rules defined in Section 27.3.2.8 (RU restrictions for 20 MHz operation) of the IEEE specification in case the SST STA is a 20-MHz operating STA. Another exception may be that the AP may need to ensure that the trigger-enabled TWT SPs do not overlap with TBTTs at which delivery traffic indication map (DTIM) Beacon frames are sent. A further exception may be that the AP may need to ensure that the same subchannel is used for all trigger-enabled TWT SPs that overlap in time.

Furthermore, with respect to HE SST, an HE SST STA operating on the secondary channel may not conduct OMI operation as defined in Section 26.9 (Operating mode indication) of the IEEE specification or OMN operation as defined in Section 11.41 (Notification of operating mode changes) of the IEEE specification to change the operating bandwidth. The HE SST STA may follow the rules defined in Section 26.8.2 (Individual TWT agreements) of the IEEE specification to exchange frames with the HE SST AP during negotiated trigger-enabled TWT SPs with some exceptions. A first exception may be that the STA may need to be available in the subchannel indicated in the TWT Channel field of the TWT Response at TWT start times. A second exception may be that the STA may not access the medium in the subchannel using Distributed Coordination Function (DCF) or Enhanced Distributed Channel Access Function (EDCAF). A third exception may be that the STA may not respond to Trigger frames addressed to it (e.g., Section 26.5 (MU operation) and Section 26.8.2 (Individual TWT agreements) of the IEEE specification) unless it has performed clear channel access (CCA) until a frame is detected by which it can set its NAV, or until a period equal to NA VSyncDelay has transpired, whichever is earlier. A fourth exception may be that the STA may need to update its network allocation vector (NAV) according to Section 26.2.4 (Updating two NAVs) of the IEEE specification if it receives a PPDU in the sub-channel.

With respect to multi-link operation, a multi-link framework may involve a multi-link device (MLD) which has a medium access control (MAC) address that singly identifies the MLD management entity. For instance, the MAC address may be used in a multi-link setup between a non-AP MLD and an AP MLD. On a high-level view, MLD MAC address may be used to identify and differentiate different MLDs. The wireless medium (WM) MAC address of a STA may be used for on-the-air (OTA) transmission on the corresponding wireless medium. For an AP MLD to continue to serve a legacy non-high-throughput (non-HT)/high-throughput (HT)/very-high-throughput (VHT)/HE STA, each affiliated AP of the AP MLD may use a different MAC address as ambiguity may exist when two affiliated APs use the same MAC address. For example, in case a first AP (AP1) and a second AP (AP2) use the same MAC address, it would be difficult for a legacy STA to discern whether AP2 is a different AP of AP1 or whether AP2 is actually AP1 performing channel switching. For a non-AP MLD, in case an AP MLD uses different MAC addresses for affiliated STAs, symmetric operation may be performed by the non-AP MLD as well. For instance, the non-AP MLD may serve as a soft AP for peer-to-peer communication, as symmetric operation would simplify implementation considerations. Moreover, transmission from non-AP MLD to AP MLD in different links may have the same Nonce for different messages in case affiliated non-AP STAs have the same MAC address under the same PN space/PTK, which would destroy the security property.

For legacy association, an AP may differentiate different associated non-Ap STAs through MAC addresses of the non-AP STAs. For a multi-link setup, differentiation of different non-AP MLDs may require a similar identifier, and the MAC addresses of non-AP MLDs may serve a similar purpose. On one hand, in case such an identifier has a small size, the small size may lead to identifier collision and confusion in the setup. On the other hand, without any identifier, differentiation of different non-AP MLDs may need to be based on all the configuration details of the non-AP MLDs, but determination of the differences with different configurations would be difficult. Knowing the MAC address of a non-AP MLD after setup may be useful for subsequent negotiations such as negotiations for security and beacon announcement (BA). The MAC address of a non-AP MLD may be indicated during the multi-link setup procedure.

For legacy association, the MAC address of the associated AP may be known before association. For a multi-link setup, it is yet to be defined as to whether discovery of an AP MLD may provide the MAC address of the AP MLD. In case the address of the AP MLD is not known before the multi-link setup, having the address of the AP MLD in the multi-link setup procedure may be useful for subsequent negotiations. In case the address of the AP MLD is known before the multi-link setup, having the address of the AP MLD in the multi-link setup procedure may be useful to confirm the destined MLD for setup and avoid unknown corner cases. For instance, the MAC address of an AP MLD may be indicated during the multi-link setup procedure.

Figure 2:
FIG. 2 is a diagram of an example scenario in accordance with an implementation of the present disclosure.

Under a proposed scheme in accordance with the present disclosure, for efficient frequency utilization of an EHT 320-MHz BSS, a 160-MHz operating STA may operate in either a primary 160-MHz channel or a secondary 160-MHz channel within the 320-MHz BSS bandwidth. FIG. 2 illustrates an example scenario 200 of an example implementation of the proposed scheme.

Figure 3:
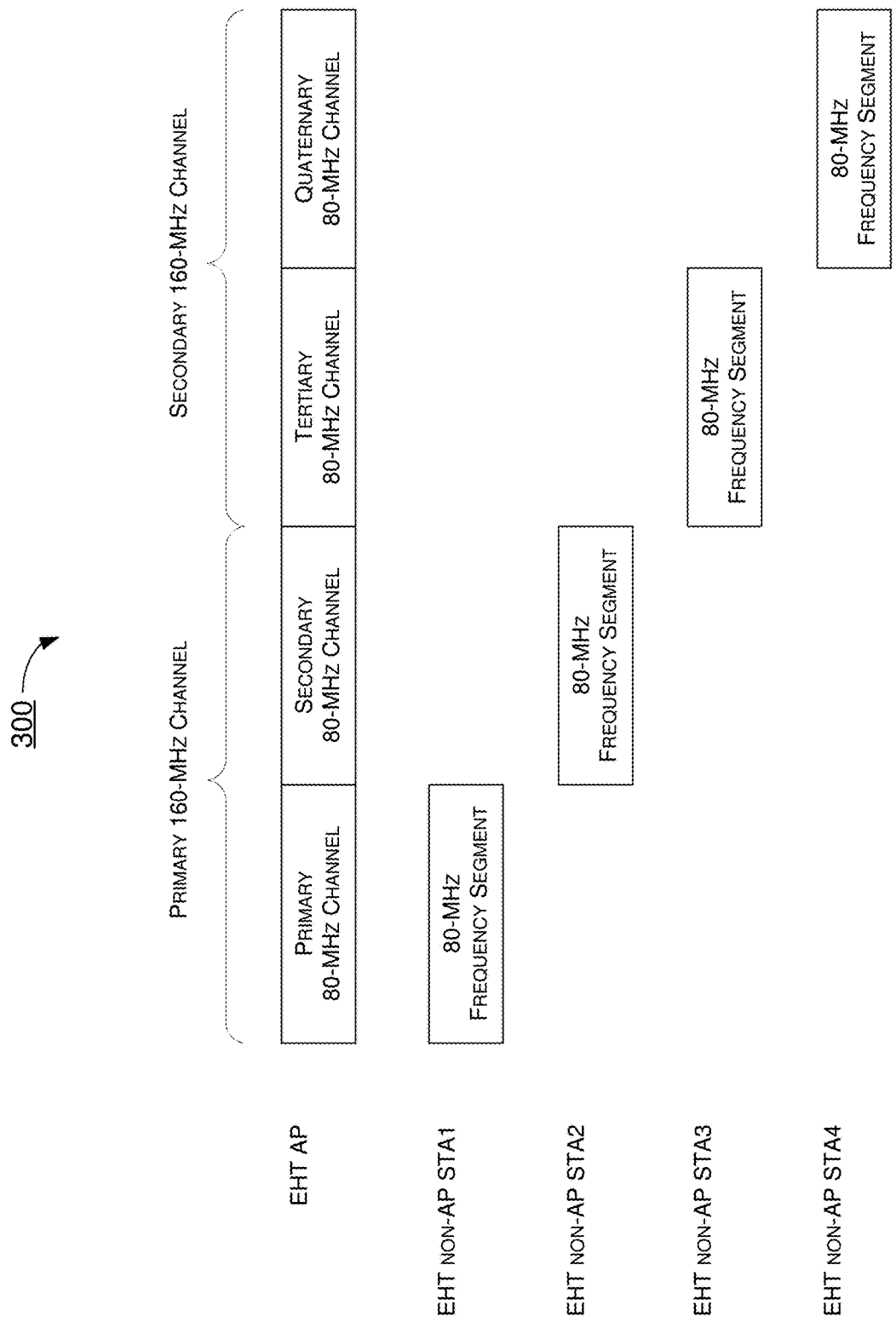
FIG. 3 is a diagram of an example scenario in accordance with an implementation of the present disclosure.

Under a proposed scheme in accordance with the present disclosure, for efficient frequency utilization of an EHT 320-MHz BSS, an 80-MHz or a 20-MHz operating STA may operate in any 80-MHz or 20-MHz channel within the 320-MHz BSS bandwidth. FIG. 3 illustrates an example scenario 300 of an example implementation of the proposed scheme.

Figure 4:
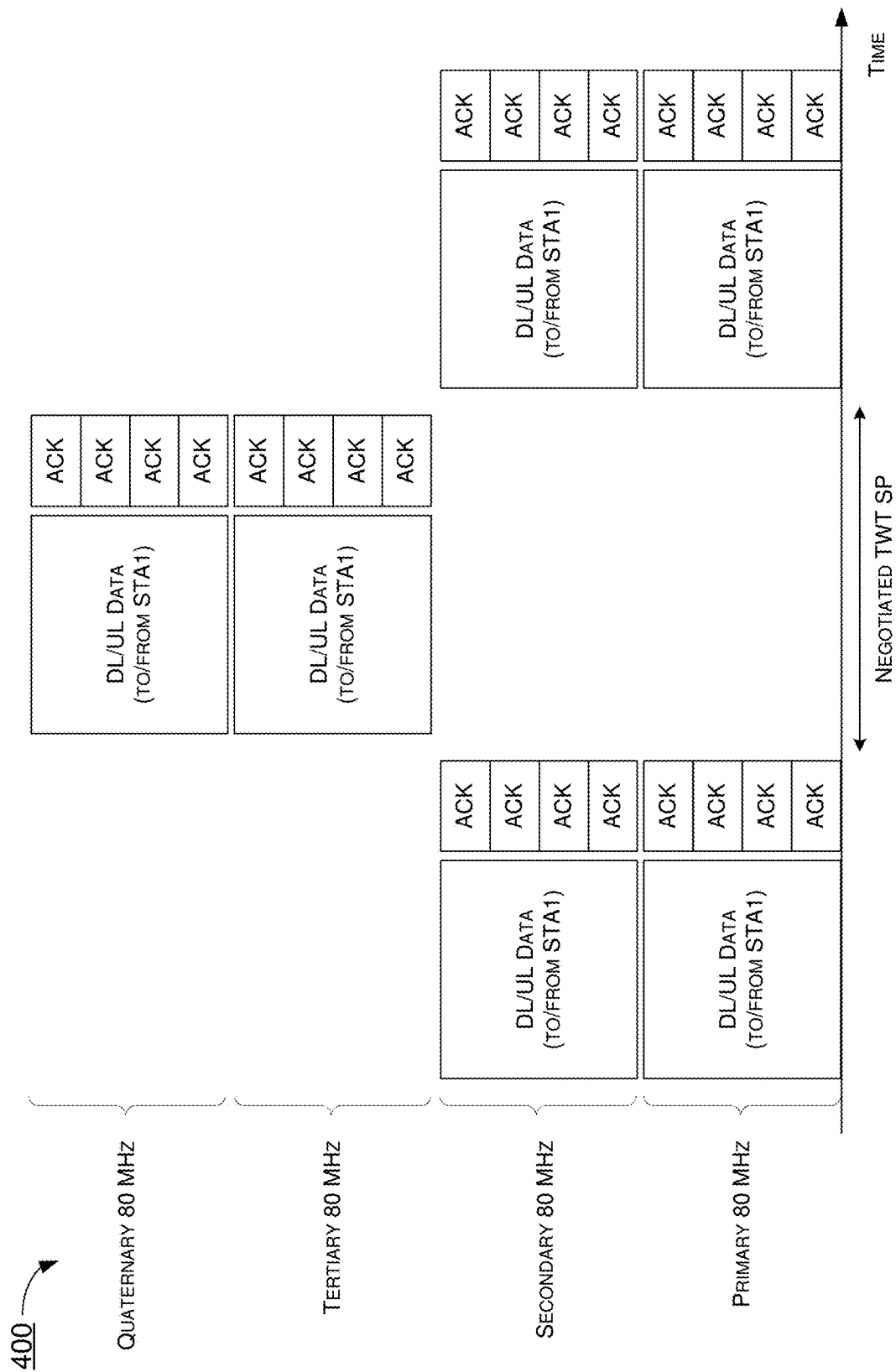
FIG. 4 is a diagram of an example scenario in accordance with an implementation of the present disclosure.

Under a proposed scheme in accordance with the present disclosure with respect to EHT SST operation for a 160-MHz operating STA, for an EHT SST AP (e.g., AP 110) and an EHT SST non-AP STA (e.g., STA 120), the positions of a first 80-MHz frequency segment and a second 80-MHz frequency segment of the EHT SST non-AP STA may be switched to respective negotiated positions during a negotiated TWT SP. FIG. 4 illustrates an example scenario 400 of an example implementation of the proposed scheme.

Figure 5:
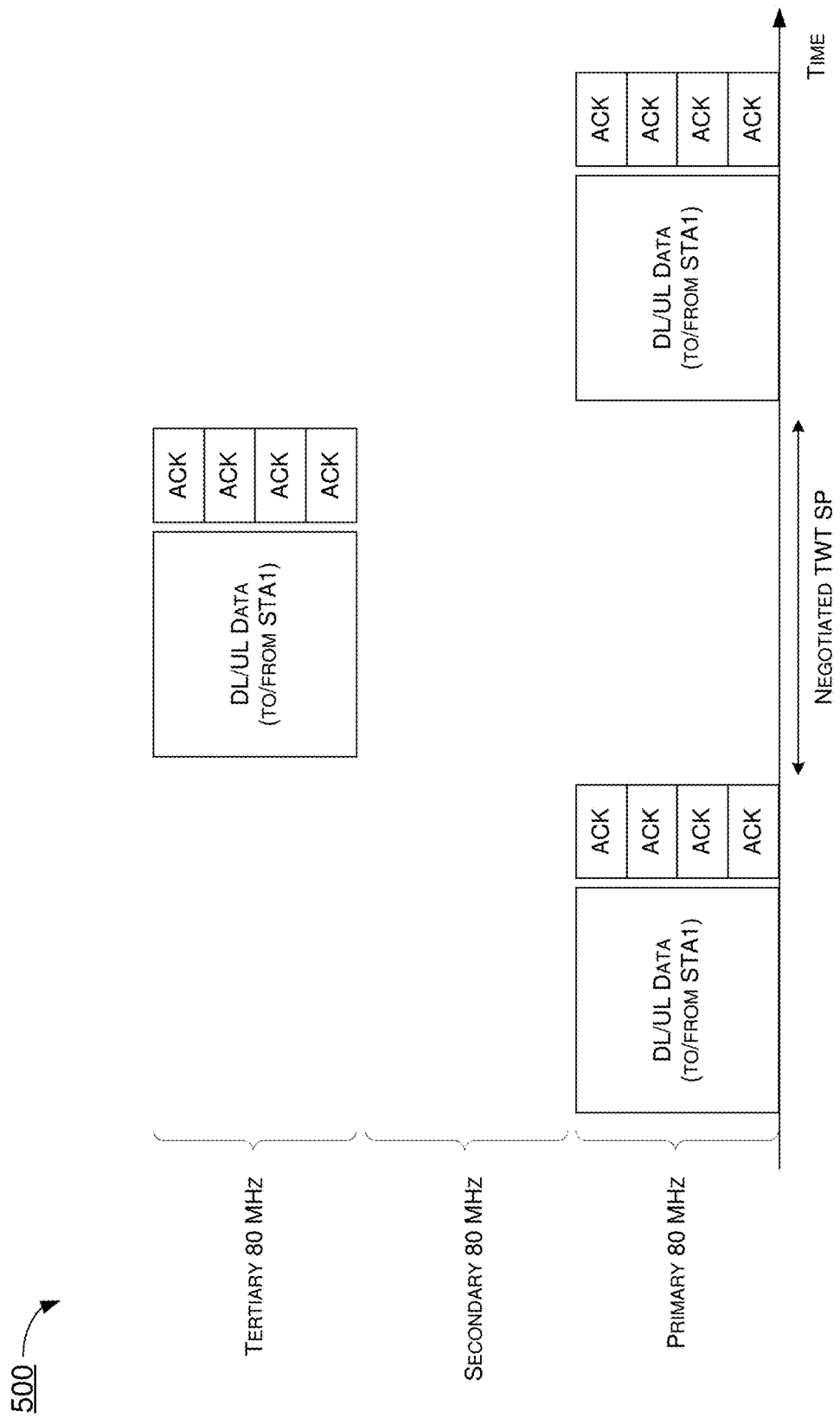
FIG. 5 is a diagram of an example scenario in accordance with an implementation of the present disclosure.

Under a proposed scheme in accordance with the present disclosure with respect to EHT SST operation for an 80-MHz or a 20-MHz operating STA, for an EHT SST AP (e.g., AP 110) and an EHT SST non-AP STA (e.g., STA 120), where the positions of a 80-MHz or 20-MHz frequency segment of the EHT SST non-AP STA may be switched to a negotiated position during a negotiated TWT SP. FIG. 5 illustrates an example scenario 500 of an example implementation of the proposed scheme.

FIG. 6 illustrates an example design 600 of an example TWT element for EHT SST in accordance with a proposed scheme of the present disclosure. Referring to FIG. 6, under the proposed scheme, the TWT element may include an Element identifier (ID) field of 1 octet long, a Length field of 1 octet long, a Control field of 1 octet long, and a TWT Parameter Information field of a variable length. The Control field may include several subfields, including: a Null Data Packet (NDP) Paging Indicator subfield of 1 bit long, a Responder PM Mode subfield of 1 bit long, a Negotiation Type subfield of 2 bits long, a TWT Information Frame Disabled subfield of 1 bit long, a Wake Duration Unit subfield of 1 bit long, a TWT Channel Length subfield of 1 bit long, and a Reserved subfield of 1 bit long.

Figure 7:
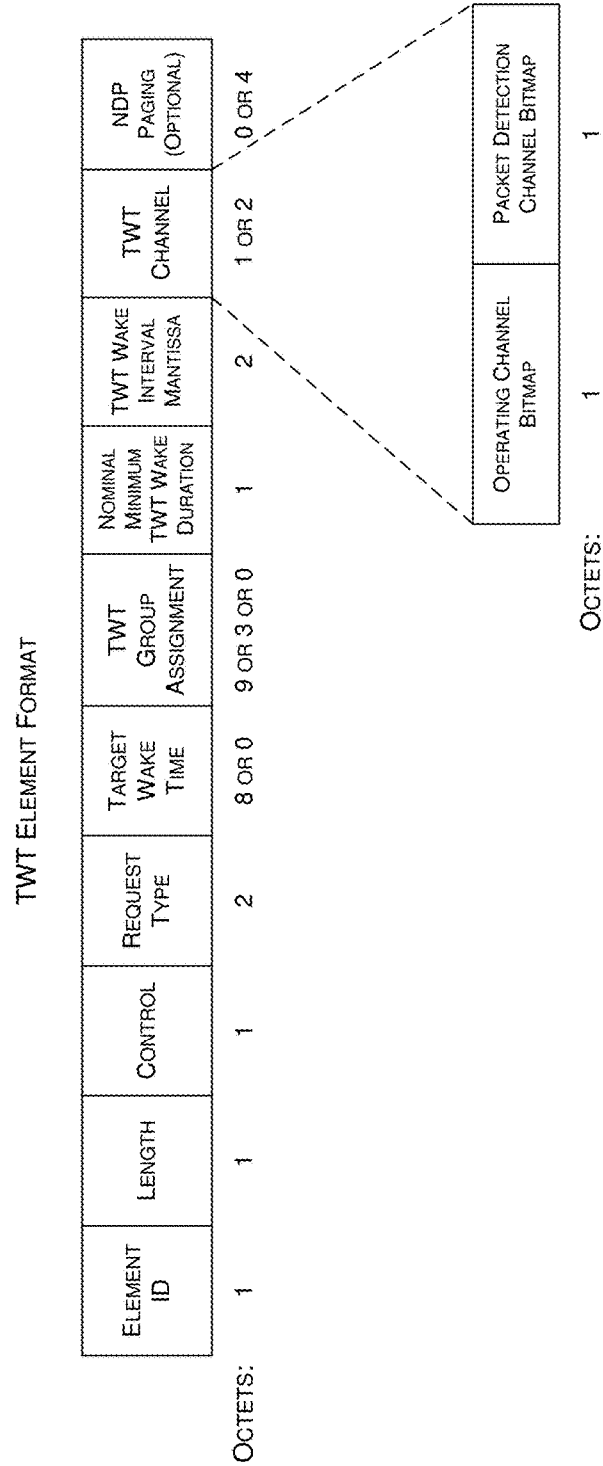
FIG. 7 is a diagram of an example design in accordance with an implementation of the present disclosure.

FIG. 7 illustrates an example design 700 of another example TWT element for EHT SST in accordance with the proposed scheme of the present disclosure. Referring to FIG. 7, under the proposed scheme, the TWT element may include an Element ID field of 1 octet long, a Length field of 1 octet long, a Control field of 1 octet long, a Request Type field of 2 octets long, an optional Target Wake Time field of 8 or 0 octets long, an optional TWT Group Assignment field of 9 or 3 or 0 octets long, a Nominal Minimum TWT Wake Duration field of 1 octet long, a TWT Wake Interval Mantissa field of 2 octets long, a TWT Channel field of 1 or 2 octets long, and an optional NDP Paging field of 0 or 4 octets long. For instance, the TWT Channel field may include an Operating Channel Bitmap subfield of 1 octet long and a Packet Detection Channel Bitmap of 1 octet long. Under the proposed scheme, the length of the TWT Channel field in the TWT Parameter Set field may be determined by a TWT Channel Length subfield in the Control field in the TWT element. The TWT Channel Length subfield in the Control field in the TWT element may indicate the length of the TWT Channel field. The TWT Channel Length subfield may be set to 0 in case the length of the TWT Channel field is 1 byte or 1 in case the length of the TWT Channel field is 2 bytes. A non-EHT non-AP STA may set the TWT Channel Length subfield to 0.

Under a proposed scheme in accordance with the present disclosure, an EHT SST non-AP STA (e.g., STA 120) may set up or otherwise establish an EHT SST operation by negotiating a trigger-enabled TWT as defined in Section 26.8.2 (Individual TWT agreements) of the IEEE specification with exception(s). One exception may be that, when the TWT Channel Length subfield is equal to 1, each bit in the Operating Channel Bitmap subfield in the TWT Channel field may correspond to an 80-MHz channel. For example, a TWT Response may have an Operating Channel Bitmap subfield in the TWT Channel field with up to one bit set to 1 to indicate the 80-MHz frequency segment that would contain the RU allocations addressed to the EHT SST non-AP STA that is either a 20-MHz operating STA or an 80-MHz operating STA. Furthermore, an operating channel of a 20-MHz operating STA may be determined within the 80-MHz frequency segment by the Packet Detection Channel Bitmap subfield. As another example, the TWT Response may have an Operating Channel Bitmap subfield in the TWT Channel field with either bits B0-B1 or bits B2-B3 set to 1 to indicate whether the primary 160-MHz channel or the secondary 160-MHz channel contains the RU allocations addressed to the EHT SST non-AP STA that is a 160-MHz operating STA.

Under a proposed scheme in accordance with the present disclosure, the Packet Detection Channel Bitmap subfield in the TWT Channel field may indicate the position of a packet detection channel of an EHT SST non-AP STA (e.g., STA 120) during the negotiated trigger-enabled TWT SPs. For instance, when the TWT Channel Length subfield is equal to 1, the TWT Response may have the N$^{th}$ bit in the Packet Detection Channel Bitmap subfield in the TWT Channel field set to 1. The EHT SST non-AP STA may perform the packet detection on the N$^{th}$ 20-MHz channel in the operating bandwidth indicated by the Operating Channel Bitmap subfield in the TWT Channel field. Additionally, a TWT Request may indicate one or more channels as the preferred packet detection channels. Moreover, a TWT Response may indicate multiple channels as the packet detection channels.

Under a proposed scheme in accordance with the present disclosure, an EHT SST non-AP STA (e.g., STA 120) that successfully sets up an SST operation may follow certain rules and an EHT SST AP (e.g., AP 110) may follow the rules defined in Section 26.8.2 (Individual TWT agreements) of the IEEE specification to exchange frames with the EHT SST non-AP STA during negotiated trigger-enabled TWT SPs with some exceptions. One exception may be that the EHT SST AP may need to ensure that the RUs allocated in DL MU PPDUs and in Trigger frames addressed to the EHT SST non-AP STA are within the subchannel indicated in the Operating Channel Bitmap subfield in the TWT Channel field of the TWT Response, and the EHT SST AP may follow the RU restriction rules defined in Section 27.3.2.8 (RU restrictions for 20-MHz operation) of the IEEE specification in case the EHT SST non-AP STA is a 20-MHz operating STA. Another exception may be that the EHT SST AP may need to ensure that the trigger-enabled TWT SPs do not overlap with TBTTs at which DTIM Beacon frames are sent. A further exception may be that the EHT SST AP may need to ensure that the same subchannel is used for all trigger-enabled TWT SPs that overlap in time.

Under a proposed scheme in accordance with the present disclosure, an EHT SST non-AP STA (e.g., STA 120) may follow the rules defined in Section 26.8.2 (Individual TWT agreements) of the IEEE specification to exchange frames with an EHT SST AP (e.g., AP 110) during trigger-enabled TWT SPs with some exceptions. A first exception may be that the EHT SST non-AP STA may need to be available in the subchannel indicated in the Operating Channel Bitmap subfield in the TWT Channel field of the TWT Response at TWT start times. A second exception may be that the EHT SST non-AP STA may not access the medium in a subchannel using DCF or EDCAF unless the subchannel includes the primary channel. A third exception may be that the EHT SST non-AP STA may not respond to Trigger frames addressed to it unless the EHT SST non-AP STA has performed CCA until a frame is detected by which the EHT SST non-AP STA can set its NAV or until a period equal to NAVSyncDelay has transpired, whichever is earlier. A fourth exception may be that the EHT SST non-AP STA may update its NAV according to Section 26.2.4 (Updating two NAVs) of the IEEE specification in case the EHT SST non-AP STA receives a PPDU in the subchannel. Under the proposed scheme, an EHT SST non-AP STA in a single-radio non-AP MLD may include a Channel Switch Timing element in Association (or Re-Association) Request frames it transmits to an HE SST AP in an AP MLD to indicate the time required by the EHT SST non-AP STA to switch between different subchannels.

Figure 8:
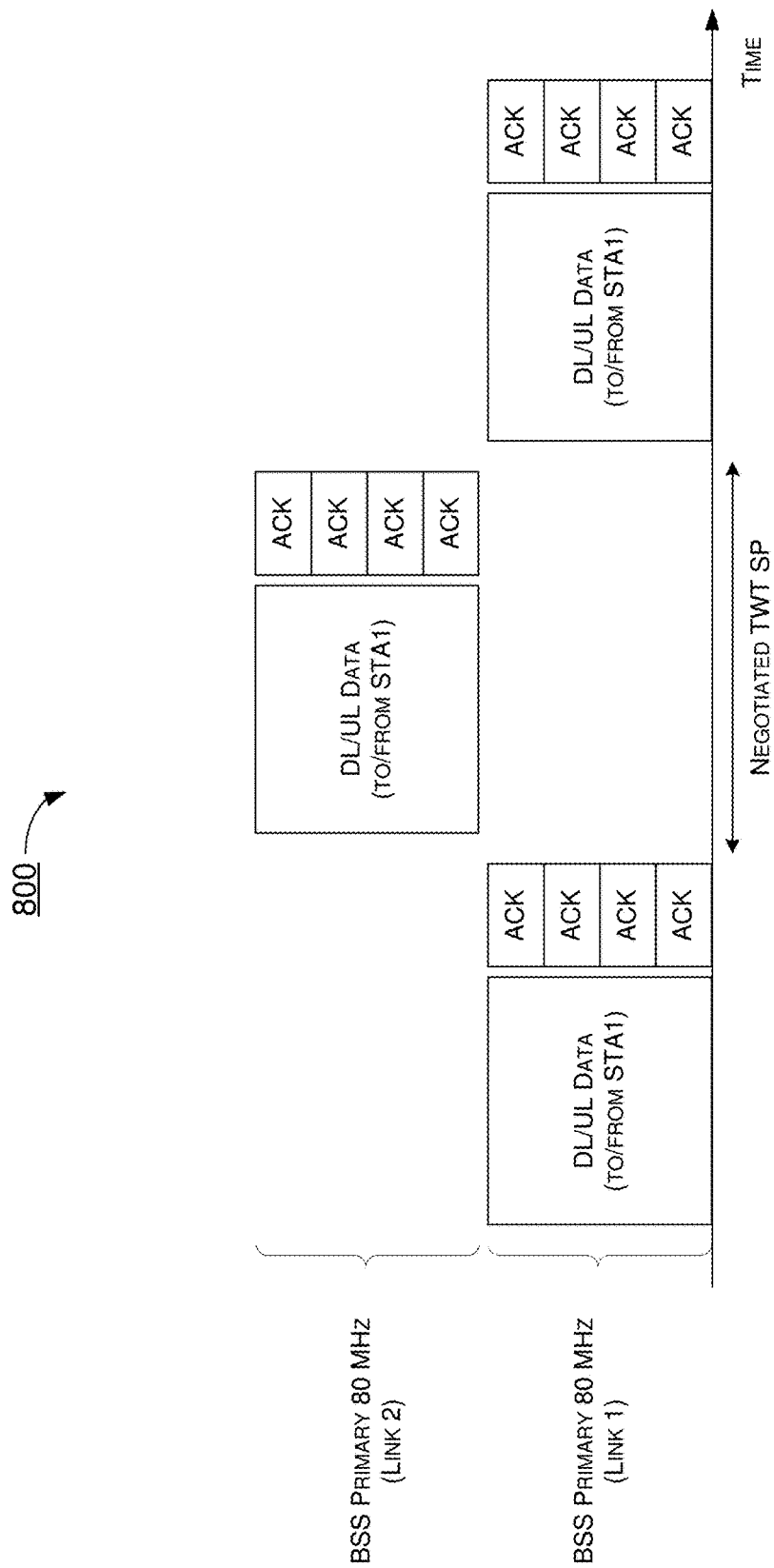
FIG. 8 is a diagram of an example scenario in accordance with an implementation of the present disclosure.

Under a proposed scheme in accordance with the present disclosure with respect to EHT multi-link SST, for an EHT SST AP (e.g., AP 110) in an AP MLD and an EHT SST non-AP STA (e.g., STA 120) in a single-radio non-AP MLD, the positions of a 160-MHz, 80-MHz or 20-MHz frequency segment of the EHT SST non-AP STA in the single-radio non-AP MLD may be switched to respective negotiated positions in another link during a negotiated TWT SP. FIG. 8 illustrates an example scenario 800 of an example implementation of the proposed scheme. Referring to FIG. 8, for a first STA (STA1) as an EHT SST non-AP STA, DL and/or UL data transmission to and/or from STA1, as well as respective acknowledgement (ACK), may be performed in a BSS primary 80-MHz frequency segment on link 1 initially. Then, for a negotiated TWT SP, STA1 may switch its operating segment to a BSS primary 80-MHz frequency segment on link 2 and perform DL and/or UL data transmission (and respective ACK) on link 2 during the negotiated TWT SP. After the negotiated TWT SP, STA1 may switch its operating segment back to the BSS primary 80-MHz frequency segment on link 1 and perform DL and/or UL data transmission (and respective ACK) on link 1.

Figure 9:
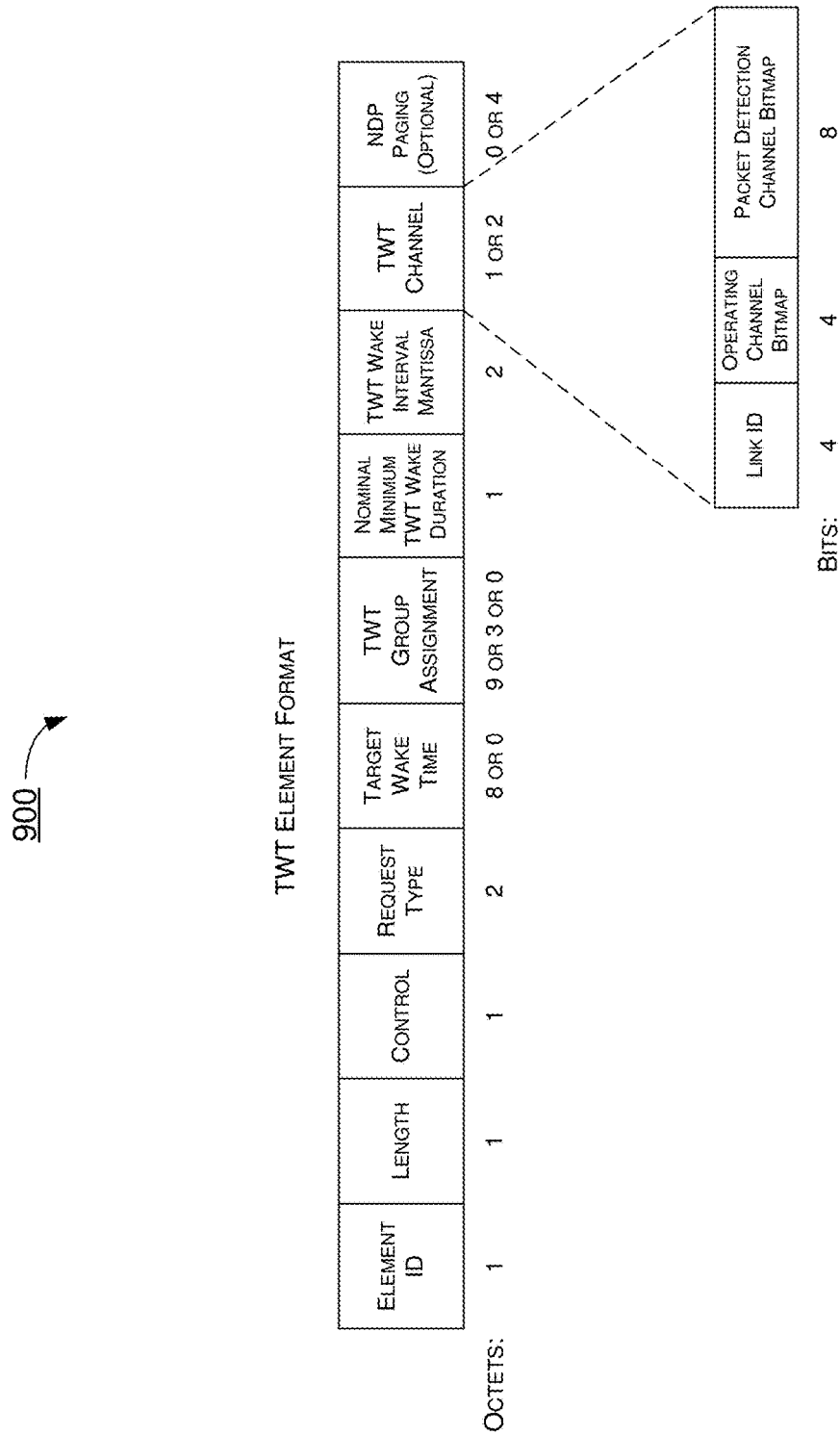
FIG. 9 is a diagram of an example design in accordance with an implementation of the present disclosure.

FIG. 9 illustrates an example design 900 of another example TWT element for EHT multi-link SST in accordance with a proposed scheme of the present disclosure. Referring to FIG. 9, under the proposed scheme, a TWT element may include an Element ID field of 1 octet long, a Length field of 1 octet long, a Control field of 1 octet long, a Request Type field of 2 octets long, an optional Target Wake Time field of 8 or 0 octets long, an optional TWT Group Assignment field of 9 or 3 or 0 octets long, a Nominal Minimum TWT Wake Duration field of 1 octet long, a TWT Wake Interval Mantissa field of 2 octets long, a TWT Channel field of 1 or 2 octets long, and an optional NDP Paging field of 0 or 4 octets long. For instance, the TWT Channel field may include a Link ID subfield of 4 bits long, an Operating Channel Bitmap subfield of 4 bits long, and a Packet Detection Channel Bitmap of 8 bits long.

Under a proposed scheme in accordance with the present disclosure with respect to EHT multi-link SST, an EHT SST non-AP STA (e.g., STA 120) in a single-radio non-AP MLD may set up or otherwise establish an EHT multi-link SST operation by negotiating a trigger-enabled TWT as defined in Section 26.8.2 (Individual TWT agreements) of the IEEE specification with some exceptions. A first exception may be that, when the TWT Channel Length subfield is equal to 1, a TWT Response may have a Link ID subfield in the TWT Channel field to indicate the link (identified by the Operating Class and the Channel Number) that the operating bandwidth indicated by the Operating Channel Bitmap subfield in the TWT Channel field is applied during negotiated trigger-enabled TWT SPs. Moreover, a TWT Request may indicate the preferred link through a Link ID subfield in the TWT Channel field. A second exception may be that, when the TWT Channel Length subfield is equal to 1, each bit in the Operating Channel Bitmap subfield in the TWT Channel field may correspond to a respective 80-MHz channel. For instance, a TWT Response may have an Operating Bitmap subfield in the TWT Channel field with up to one bit set to 1 to indicate the 80-MHz frequency segment that would contain the RU allocations addressed to the EHT SST non-AP STA in the single-radio non-AP MLD that is either a 20-MHz operating STA or an 80-MHz operating STA. Moreover, the operating channel of a 20-MHz operating STA may be determined within an 80-MHz frequency segment by the Packet Detection Channel Bitmap subfield. A third exception may be that the TWT Response may have an Operating Channel Bitmap subfield in the TWT Channel field with up to two bits set to 1 to indicate two contiguous or non-contiguous 80-MHz frequency segments containing the RU allocations addressed to the EHT SST non-AP STA in the single-radio non-AP MLD that is an 80+80-MHz operating STA. A fourth exception may be that the TWT Response may have an Operating Channel Bitmap subfield in the TWT Channel field with all bits of up to one of bits B0-B1 and bits B2-B3 set to 1 to indicate whether a primary 160-MHz channel or a secondary 160-MHz channel contains the RU allocations addressed to the EHT SST non-AP STA in the single-radio non-AP MLD that is a 160-MHz operating STA.

Under a proposed scheme in accordance with the present disclosure with respect to EHT multi-link SST, the Packet Detection Channel Bitmap subfield in the TWT Channel field may indicate the position of the packet detection channel of an EHT SST non-AP STA (e.g., STA 120) in a single-radio non-AP MLD during negotiated trigger-enabled TWT SPs. Under the proposed scheme, when the TWT Channel Length subfield is equal to 1, a TWT Response may have the $N^{th}$ bit in the Packet Detection Channel Bitmap subfield in the TWT Channel field set to 1. The EHT SST non-AP STA in the single-radio non-AP MLD may perform the packet detection on the $N^{th}$ 20-MHz channel in the operating bandwidth indicated by the Operating Channel Bitmap subfield in the TWT Channel field. Additionally, a TWT Request may indicate one or more channels as the preferred packet detection channels. Moreover, the TWT Response may indicate multiple channels as the packet detection channels.

Under a proposed scheme in accordance with the present disclosure with respect to EHT multi-link SST, an EHT SST non-AP STA (e.g., STA 120) in a single-radio non-AP MLD that successfully sets up an EHT multi-link SST operation may follow certain rules. An EHT SST AP (e.g., AP 110) in an AP MLD may follow the rules defined in Section 26.8.2 (Individual TWT agreements) of the IEEE specification to exchange frames with the EHT SST non-AP STA in the single-radio non-AP MLD during negotiated trigger-enabled TWT SPs with some exceptions. One exception may be that the EHT SST AP may need to ensure that the RU allocated in DL MU PPDUs and Trigger frames addressed to the EHT SST non-AP STA are within the subchannel indicated in the Operating Channel Bitmap subfield in the TWT Channel field of the TWT Response and may follow the RU restriction rules defined in Section 27.3.2.8 (RU restrictions for 20-MHz operation) of the IEEE specification in case the EHT SST non-AP STA is a 20-MHz operating STA. Another exception may be that the EHT SST AP may need to ensure that the trigger-enabled TWT SPs do not overlap with Target Beacon Transmission Times (TBTTs) at which DTIM Beacon frames are sent. A further exception may be that the EHT SST AP may need to ensure that the same subchannel is used for all trigger-enabled TWT SPs that overlap in time.

Under a proposed scheme in accordance with the present disclosure with respect to EHT multi-link SST, an EHT SST non-AP STA (e.g., STA 120) in a single-radio non-AP MLD may follow the rules in Section 26.8.2 (Individual TWT agreements) of the IEEE specification to exchange frames with an EHT SST AP (e.g., AP 110) in an AP MLD during trigger-enabled TWT SPs with some exceptions. A first exception may be that the EHT SST non-AP STA may need to be available in the subchannel of the link indicated in the Link ID and the Operating Channel Bitmap subfield in the TWT Channel field of the TWT Response at TWT start times. A second exception may be that the EHT SST non-AP STA may not access the wireless medium in the subchannel using DCF or EDCAF unless the subchannel includes the primary channel. A third exception may be that the EHT SST non-AP STA may not respond to Trigger frames addressed to it unless the EHT SST non-AP STA has performed CCA until a frame is detected by which it can set the NAV thereof or until a period equal to NAVSyncDelay has transpired, whichever is earlier. A fourth exception may be that the EHT SST non-AP STA may update its NAV according to Section 26.2.4 (Updating two NAVs) of the IEEE specification in case the EHT SST non-AP STA receives a PPDU in the subchannel.

Under a proposed scheme in accordance with the present disclosure with respect to EHT multi-link SST, an EHT SST non-AP STA (e.g., STA 120) in a single-radio non-AP MLD may include a Channel Switch Timing element in Association (or Re-Association) Request frames it transmits to an HE SST AP (e.g., AP 110) in an AP MLD to indicate the time required by the EHT SST non-AP STA to switch between different subchannels. Alternatively, or additionally, the EHT SST non-AP STA may include a Link Switch Timing element in Association (or Re-Association) Request frames it transmits to the HE SST AP to indicate the time required by the EHT SST non-AP STA to switch between different links.

Under a proposed scheme in accordance with the present disclosure with respect to EHT enhanced multi-link SST operation, in case a STA in a STA MLD receives a multi-user request-to-send (MU-RTS) frame and it can respond with a clear-to-send (CTS) frame as both a virtual carrier sense (CS) (e.g., NAV) and a physical CS are idle, then other STAs in the STA MLD may switch their receive (and transmit) chains to the link on which the STA received the MU-RTS frame. In such cases, the MU-RTS frame may start a frame exchange sequence, and the MU-RTS frame may be transmitted with a single-spatial stream. After responding with the CTS frame, the STA MLD may be able to transmit or receive frames on the link in which the MU-RTS frame was received and may not transmit or receive on the other link(s) until the end of the frame exchange sequence. In case the STA MLD does not respond with the CTS frame, the STA MLD may be in the listening operation on the multiple links. An AP in an AP MLD that sent the MU-RTS frame and received the CTS frame may transmit to the STA in the STA MLD a PPDU up to the total supported receive (Rx) spatial streams (e.g., R1+R2) of the STA MLD until the end of the frame exchange sequence.

Under a proposed scheme in accordance with the present disclosure with respect to EHT enhanced multi-link SST operation, in case a STA in a STA MLD receives a Buffer Status Report Poll (BSRP) Trigger frame from an AP in an AP MLD and it can respond with a TB PPDU containing one or more quality of service (QoS) Null frames containing the buffer status in a QoS Control field or a Buffer Status Report (BSR) Control subfield, then other STAs in the STA MLD may switch their receive (and transmit) chains to the link on which the STA received the BSRP Trigger frame. In such cases, the BSRP Trigger frame may start a frame exchange sequence, and the BSRP Trigger frame may be transmitted with a single-spatial stream. After responding with the TB PPDU, the STA MLD may be able to transmit or receive frames on the link in which the BSRP Trigger frame was received and may not transmit or receive on the other link(s) until the end of the frame exchange sequence. In case the STA MLD does not respond with the TB PPDU, the STA MLD may be in the listening operation on the multiple links. An AP in an AP MLD that sent the BSRP Trigger frame and received the TB PPDU may transmit to the STA in the STA MLD a PPDU up to the total supported Rx spatial streams (e.g., R1+R2) of the STA MLD until the end of the frame exchange sequence.

Figure 10:
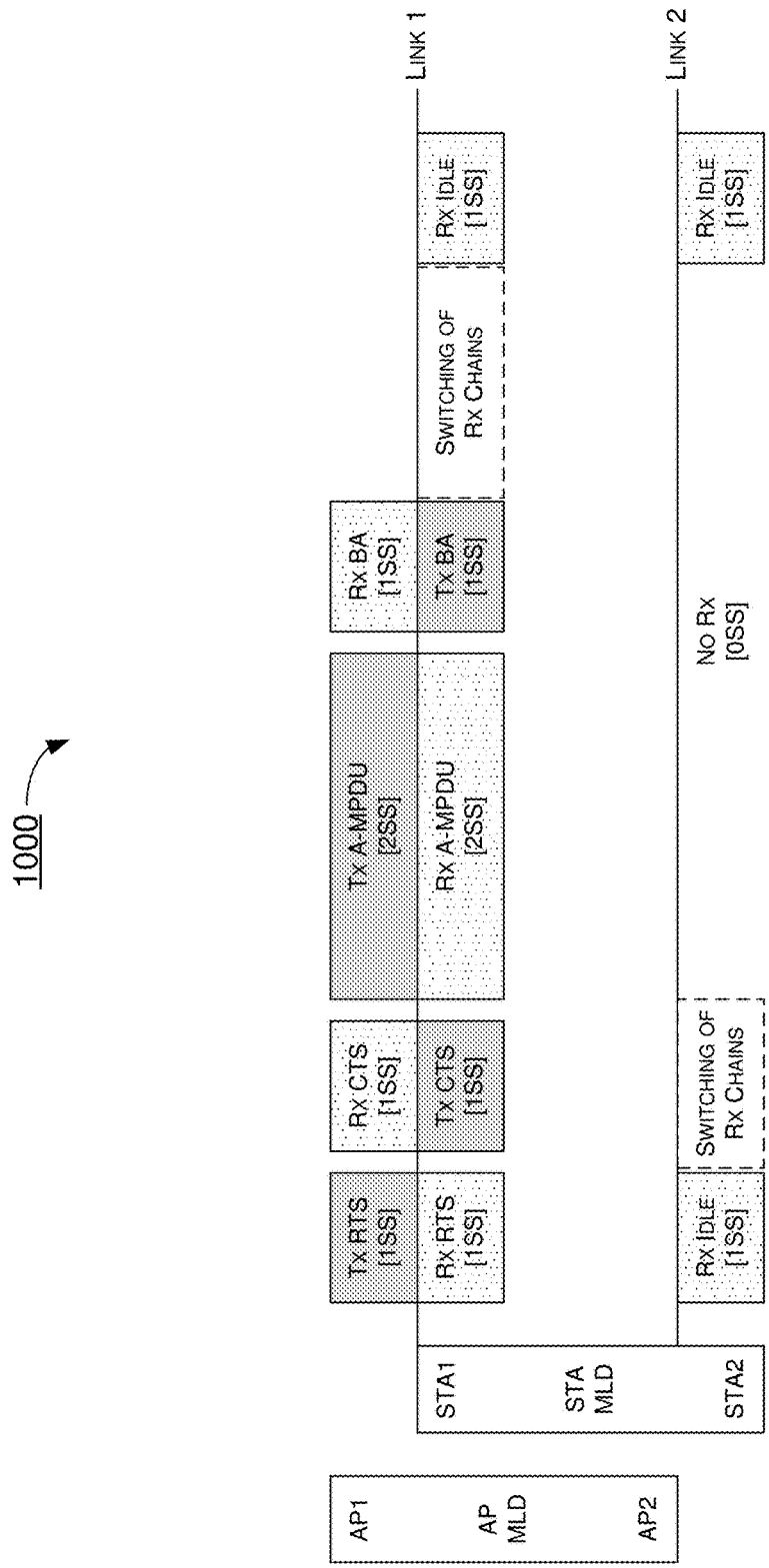
FIG. 10 is a diagram of an example scenario in accordance with an implementation of the present disclosure.

FIG. 10 illustrates an example scenario 1000 of EHT enhanced multi-link SST operation regarding receive chain switching in accordance with a proposed scheme of the present disclosure. In scenario 1000, a first STA (STA1) in a STA MLD may communicate on a first link (link 1) while a second STA (STA2) in the same STA MLD may communicate on a second link (link 2). After STA1 receives a RTS frame addressed to STA1 and when STA1 transmits a CTS frame in response to receiving the RTS frame, STA2 may switch all its receive chains on link 2 to link 1. A first AP (AP1) in an AP MLD may transmit a PPDU up to the total supported Rx spatial streams of the STA MLD instead of the supported Rx spatial streams of each link. As shown in FIG. 10, during a transmission opportunity (TXOP), AP1 may transmit one or more aggregated MAC-level protocol data units (A-MPDUs) on link 1 and STA1 may receive such A-MPDUs on link 1. At the end of the TXOP, STA1 may switch at least one of its receive chains from link 1 to link 2.

Figure 11:
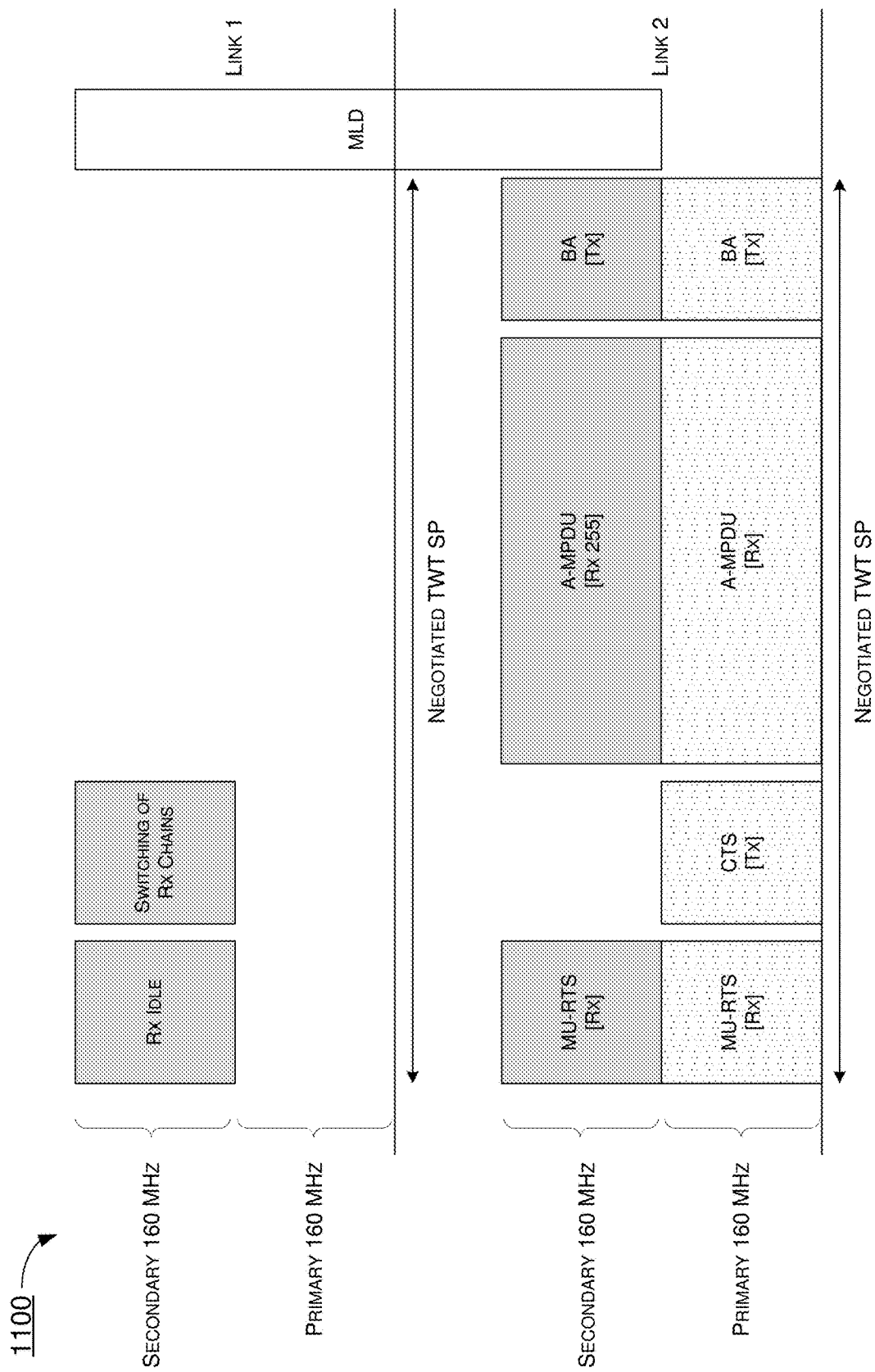
FIG. 11 is a diagram of an example scenario in accordance with an implementation of the present disclosure.

FIG. 11 illustrates an example scenario 1100 of EHT enhanced multi-link SST operation in accordance with a proposed scheme of the present disclosure. In scenario 1100, after a STA in a STA MLD receives an MU-RTS on a given link, other STAs in the STA MLD may switch their receive chains (and transmit chains) to the same link on which the STA received the MU-RTS. Additionally, in scenario 1100, the APs with which the other STAs are associated may not transmit a PPDU to those corresponding STAs even during a negotiated TWT SP. Referring to FIG. 11, after receiving a respective MU-RTS in each of a primary 160-MHz segment and a secondary 160-MHz segment on link 2 during a negotiated TWT SP, a STA in a STA MLD may respond with a CTS in the primary 160-MHz segment on link 2. Meanwhile, other STA(s) in the STA MLD may switch their receive chains from link 1 to link 2. Then, one or more A-MPDUs may be received by the STA on link 2 in both the primary 160-MHz segment and the secondary 160-MHz segment followed by transmission of a respective block acknowledgement (BA) on link 2 in each of the primary 160-MHz segment and the secondary 160-MHz segment by the STA. Also, as shown in FIG. 11, the AP may not transmit any PPDU on link 1 during the negotiated TWT SP.

Figure 12:
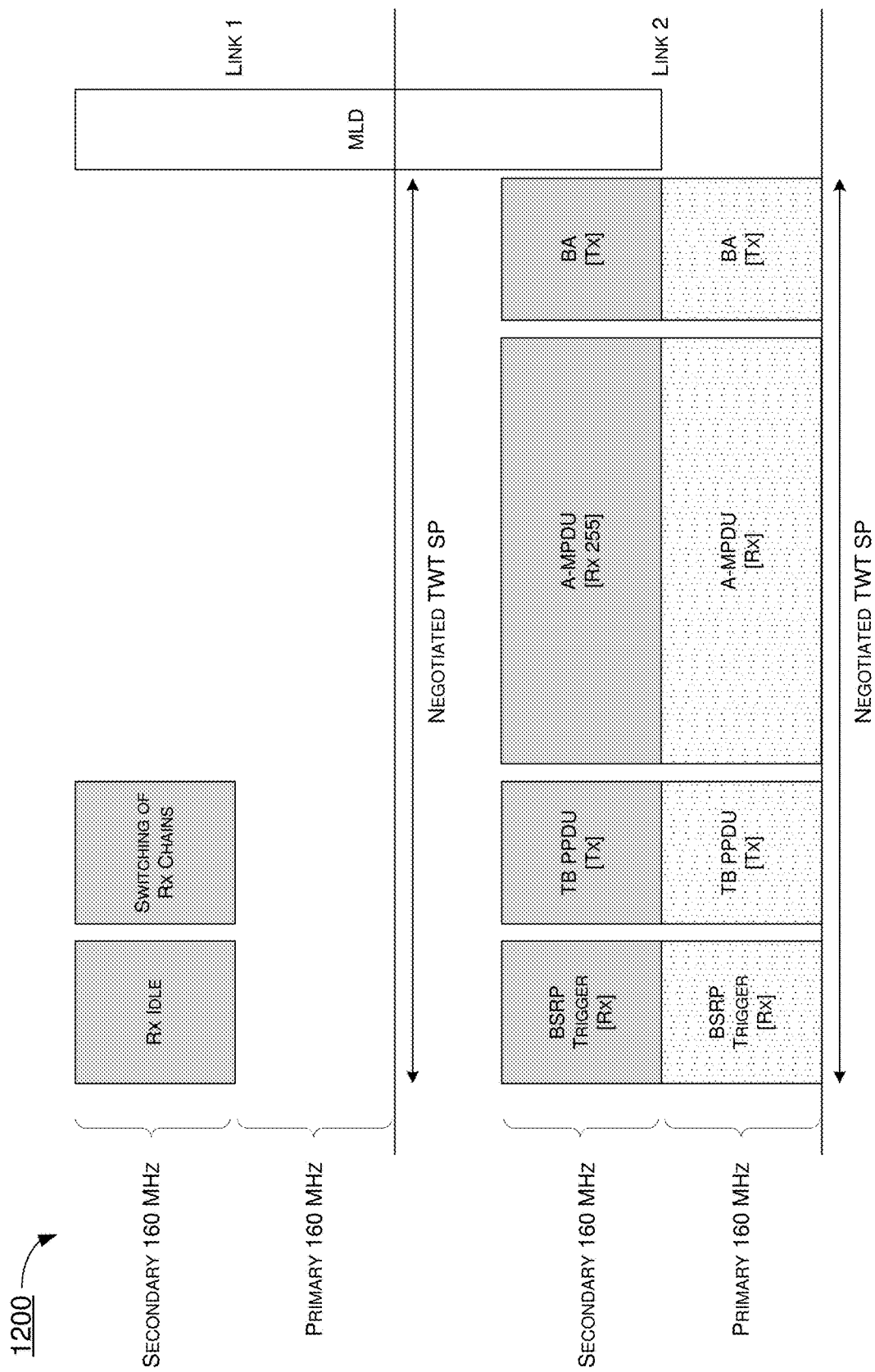
FIG. 12 is a diagram of an example scenario in accordance with an implementation of the present disclosure.

FIG. 12 illustrates an example scenario 1200 of EHT enhanced multi-link SST operation in accordance with a proposed scheme of the present disclosure. Referring to FIG. 12, after a STA in a STA MLD receives a BSRP Trigger frame on a given link, other STAs in the STA MLD may switch their receive chains (and transmit chains) to the same link on which the STA received the BSRP Trigger frame. Additionally, the APs with which the other STAs are associated may not transmit a PPDU to those corresponding STAs even during a negotiated TWT SP. Referring to FIG. 12, after receiving a respective BSRP Trigger frame in each of a primary 160-MHz segment and a secondary 160-MHz segment on link 2 during a negotiated TWT SP, a STA in a STA MLD may respond with a respective TB PPDU in each of a primary 160-MHz segment and a secondary 160-MHz segment on link 2. Meanwhile, other STA(s) in the STA MLD may switch their receive chains from link 1 to link 2. Then, one or more A-MPDUs may be received by the STA on link 2 in both the primary 160-MHz segment and the secondary 160-MHz segment followed by transmission of a respective BA on link 2 in each of the primary 160-MHz segment and the secondary 160-MHz segment by the STA. Also, as shown in FIG. 12, the AP may not transmit any PPDU on link 1.

In view of the above, one of ordinary skill in the art would appreciate that an EHT SST operation by a 20-MHz operating STA, an 80-MHz operating STA and a 160-MHz operating STA in an EHT 320-MHz BSS may be supported by implementing one or more of the proposed schemes described herein. For instance, a TWT Request may indicate preferred channel(s) in the Operating Channel Bitmap subfield in the TWT Channel field. Correspondingly, a TWT Response may indicate the switched-to channel(s) of an EHT SST non-AP STA during the negotiated trigger-enabled TWT SP(s).

Illustrative Implementations

Figure 13:
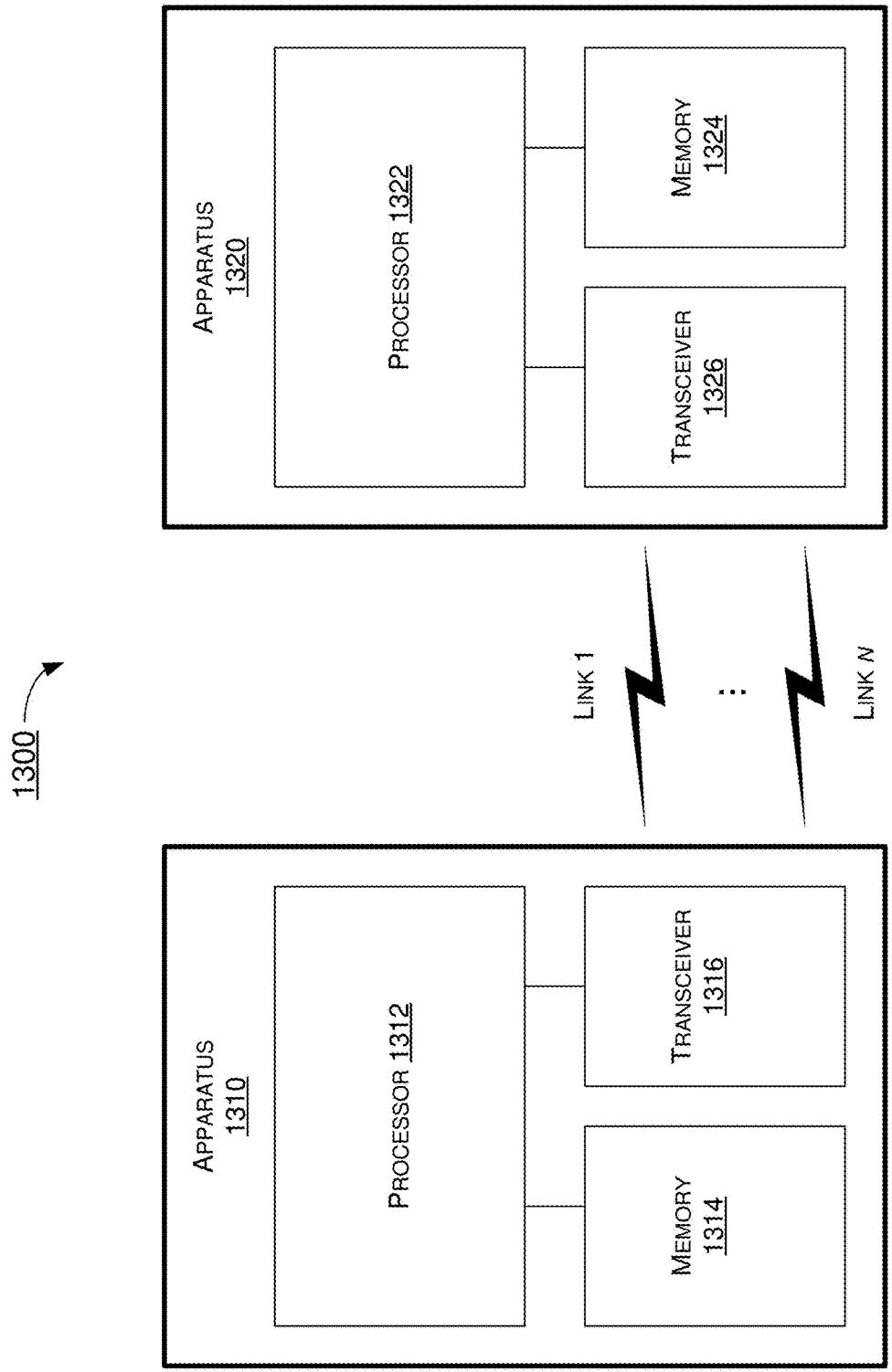
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to EHT enhanced SST operation in wireless communications, including the various schemes described above with respect to various proposed designs, concepts, schemes, systems and methods described above as well as processes described below. For instance, apparatus 1310 may be an example implementation of STA 110, and apparatus 1320 may be an example implementation of STA 120.

Each of apparatus 1310 and apparatus 1320 may be a part of an electronic apparatus, which may be a STA or an AP, such as a portable or mobile apparatus, a wearable apparatus, a wireless communication apparatus or a computing apparatus. For instance, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to EHT enhanced SST operation in wireless communications in accordance with various implementations of the present disclosure.

In some implementations, apparatus 1310 may also include a transceiver 1316 coupled to processor 1312. Transceiver 1316 may be capable of wirelessly transmitting and receiving data. In some implementations, apparatus 1320 may also include a transceiver 1326 coupled to processor 1322. Transceiver 1326 may include a transceiver capable of wirelessly transmitting and receiving data. Transceiver 1316 of apparatus 1310 and transceiver 1326 of apparatus 1320 may communicate each other over one or more of multiple links link 1~link N, with N>1, such as a first link and a second link.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as STA 110 which may be a constrained non-AP MLD, and apparatus 1320, as STA 120 which may be a constrained AP MLD, is provided below. It is noteworthy that, although the example implementations described below are provided in the context of WLAN, the same may be implemented in other types of networks.

Under a proposed scheme with respect to EHT enhanced SST operation in wireless communications in accordance with the present disclosure, a STA implemented in processor 1312 of apparatus 1310 may establish, via transceiver 1316, communications between an AP (e.g., STA 120) and a non-AP STA (e.g., STA 110) in a plurality of frequency segments within a BSS bandwidth or on at least a first link and a second link. Moreover, processor 1312 may perform, via transceiver 1316, an EHT SST operation in the plurality of frequency segments or on the first link and the second link by performing certain operations. For instance, processor 1312 may negotiate a trigger-enabled TWT SP with apparatus 1320. Additionally, processor 1312 may perform a first data transmission in a first frequency segment of the plurality of frequency segments or on the first link prior to the TWT SP. Moreover, processor 1312 may switch to a second frequency segment of the plurality of frequency segments or the second link to perform a second data transmission on the second link during the TWT SP. Furthermore, processor 1312 may switch back to the first frequency segment or the first link to perform a third data transmission on the first link after the TWT SP. In negotiating the TWT SP, processor 1312 may perform either of the following: (a) indicating one of the plurality of frequency segments as containing an RU allocation addressed to the non-AP STA; or (b) indicating one of the first link and the second link on which an operating frequency segment is located during the TWT SP.

In some implementations, in indicating the one of the plurality of frequency segments as containing the RU allocation, processor 1312 may perform certain operations. For instance, processor 1312 may indicate the one of the plurality of frequency segments by setting a respective bit of a plurality of bits in an Operating Channel Bitmap subfield in a TWT Channel field in a TWT element corresponding to the one of the plurality of frequency segments to 1. Additionally, processor 1312 may indicate a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

In some implementations, a length of the TWT Channel field may be indicated by a TWT Channel Length subfield in a Control field in the TWT element. In some implementations, the length of the TWT Channel field may be either 1 byte or 2 bytes. Additionally, the TWT Channel Length subfield may be set to 0 to indicate that the length of the TWT Channel field is 1 byte. Moreover, the TWT Channel Length subfield may be set to 1 to indicate that the length of the TWT Channel field is 2 bytes. Furthermore, in an event that the TWT Channel Length subfield is set to 1, each bit in the Operating Channel Bitmap subfield may correspond to a respective 80-MHz frequency segment in the BSS bandwidth which is a 320-MHz bandwidth. Also, each pair of bits in the Operating Channel Bitmap subfield may correspond to a respective 160-MHz frequency segment in the BSS bandwidth which is a 320-MHz bandwidth. Moreover, either a first bit and a second bit may be both set to 1 to indicate that a primary 160-MHz frequency segment in the BSS bandwidth contains the RU allocation addressed to the non-AP STA or a third bit and a fourth bit may be both set to 1 to indicate that a secondary 160-MHz frequency segment in the BSS bandwidth contains the RU allocation addressed to the non-AP STA.

In some implementations, in indicating the one of the first link and the second link on which the operating frequency segment is located, processor 1312 may perform certain operations. For instance, processor 1312 may indicate the one of the first link and the second link by setting a respective bit of a plurality of bits in a Link ID subfield in a TWT Channel field in a TWT element corresponding to the one of the first link and the second link to 1. Additionally, processor 1312 may indicate the operating frequency segment among a plurality of frequency segments within a BSS bandwidth by setting a respective bit of a plurality of bits in an Operating Channel Bitmap subfield in the TWT Channel field corresponding to the operating frequency segment to 1. Furthermore, processor 1312 may indicate a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

In some implementations, a length of the TWT Channel field may be indicated by a TWT Channel Length subfield in a Control field in the TWT element. In some implementations, the length of the TWT Channel field may be either 1 byte or 2 bytes. Additionally, the TWT Channel Length subfield may be set to 0 to indicate that the length of the TWT Channel field is 1 byte. Moreover, the TWT Channel Length subfield may be set to 1 to indicate that the length of the TWT Channel field is 2 bytes. In some implementations, in an event that the TWT Channel Length subfield is set to 1, each bit in the Operating Channel Bitmap subfield may correspond to a respective 80-MHz frequency segment in the BSS bandwidth which is a 320-MHz bandwidth. Additionally, each pair of bits in the Operating Channel Bitmap subfield may correspond to a respective 160-MHz frequency segment in the BSS bandwidth which is a 320-MHz bandwidth. Moreover, either a first bit and a second bit may be both set to 1 to indicate that a primary 160-MHz frequency segment in the BSS bandwidth contains the RU allocation addressed to the non-AP STA or a third bit and a fourth bit may be both set to 1 to indicate that a secondary 160-MHz frequency segment in the BSS bandwidth contains the RU allocation addressed to the non-AP STA.

In some implementations, in performing the EHT SST operation, processor 1312 may perform, as the non-AP STA, certain operations. For instance, processor 1312 may exchange an RTS frame and a CTS frame on the first link for a first STA in the non-AP STA. Additionally, processor 1312 may switch a second Rx chain of a second STA in the non-AP STA from the second link to the first link. Moreover, processor 1312 may receive an aggregated MAC protocol data unit (A-MPDU) on the first link for the first STA. Furthermore, processor 1312 may transmit an acknowledgement (ACK) responsive to the receiving of the A-MPDU on the first link for the first STA. Also, processor 1312 may switch a first Rx chain of the first STA from the first link to the second link after transmitting the ACK.

Alternatively, or additionally, in performing the EHT SST operation, processor 1312 may perform, as the non-AP STA and during the TWT SP, certain operations. For instance, processor 1312 may exchange an MU-RTS frame and a CTS frame on the second link for a first STA in the non-AP STA. Additionally, processor 1312 may switch a second Rx chain of a second STA in the non-AP STA from the first link to the second link. Moreover, processor 1312 may receive an A-MPDU on the second link for the first STA. Furthermore, processor 1312 may transmit an ACK responsive to the receiving of the A-MPDU on the second link for the first STA.

Alternatively, or additionally, in performing the EHT SST operation, processor 1312 may perform, as the non-AP STA and during the TWT SP, certain operations. For instance, processor 1312 may receive a respective BSRP Trigger frame in each of a primary 160-MHz frequency segment and a secondary 160-MHz frequency segment on the second link for a first STA in the non-AP STA. Additionally, processor 1312 may transmit a respective TB PPDU in each of the primary 160-MHz frequency segment and the secondary 160-MHz frequency segment on the second link for the first STA. Moreover, processor 1312 may switch a second Rx chain of a second STA in the non-AP STA from the first link to the second link. Furthermore, processor 1312 may receive a respective A-MPDU in each of the primary 160-MHz frequency segment and the secondary 160-MHz frequency segment on the second link for the first STA. Also, responsive to the receiving of the A-MPDU, processor 1312 may transmit a respective ACK in each of the primary 160-MHz frequency segment and the secondary 160-MHz frequency segment on the second link for the first STA.

Illustrative Processes

Figure 14:
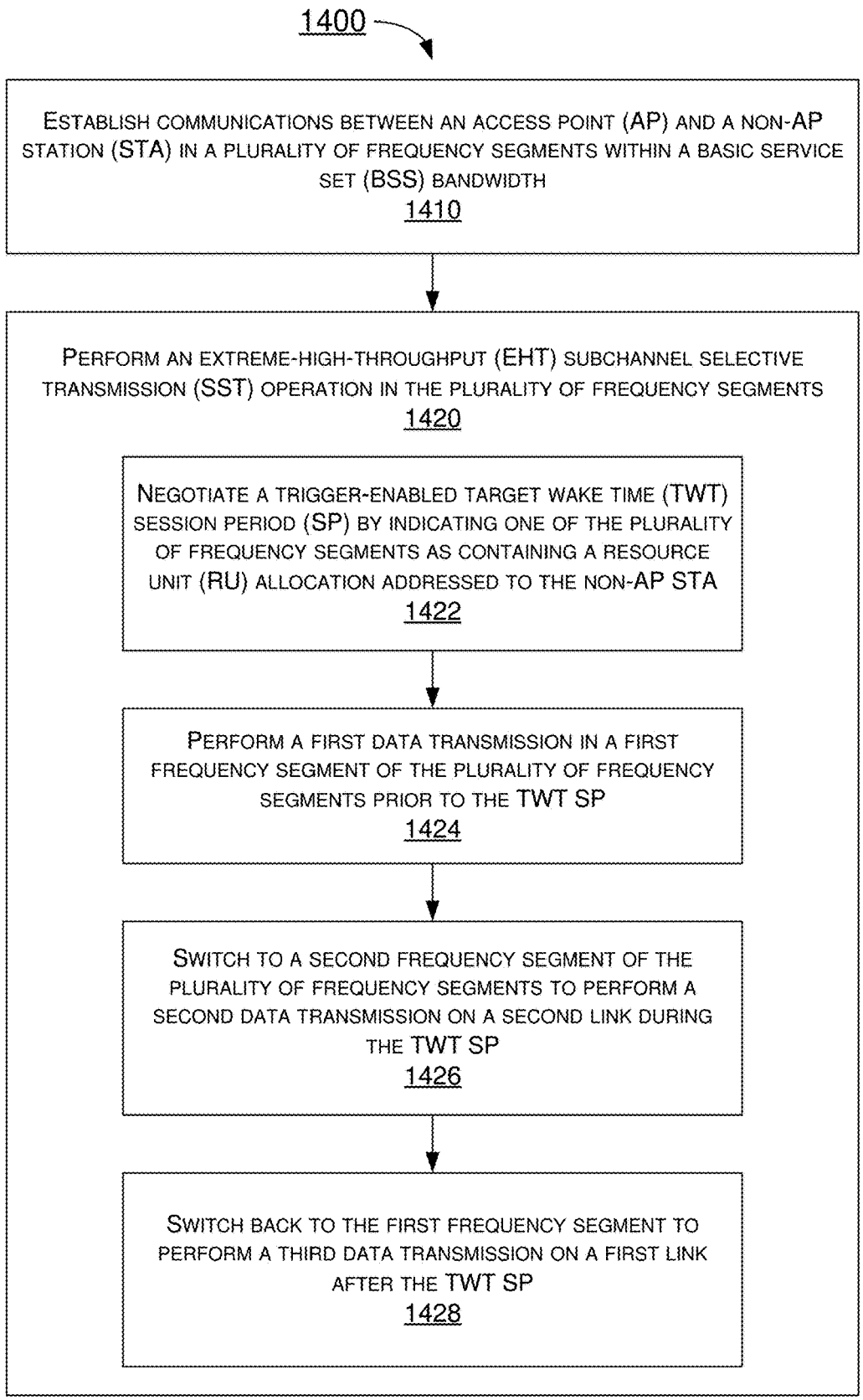
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to EHT enhanced SST operation in wireless communications in accordance with the present disclosure. Process 1400 may include one or more operations, actions, or functions as illustrated by one or more of blocks 1410 and 1420 as well as sub-blocks 1422, 1424, 1426 and 1428. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 as STA 110 (e.g., a STA or AP) and apparatus 1320 as STA 120 (e.g., a peer STA or AP) of a wireless network such as a WLAN in accordance with one or more of IEEE 802.11 standards. Process 1400 may begin at block 1410.

At 1410, process 1400 may involve processor 1312 of apparatus 1310 establishing, via transceiver 1316, communications between an AP (e.g., STA 120) and a non-AP STA (e.g., STA 110) in a plurality of frequency segments within a BSS bandwidth. Process 1400 may proceed from 1410 to 1420.

At 1420, process 1400 may involve processor 1312 performing, via transceiver 1316, an EHT SST operation in the plurality of frequency segments by performing certain operations represented by 1422, 1424, 1426 and 1428. It is noteworthy that, while some or all of the operations represented by 1422, 1424, 1426 and 1428 may be performed sequentially, some of the operations represented by some of 1422, 1424, 1426 and 1428 may be performed in parallel.

At 1422, process 1400 may involve processor 1312 negotiating a trigger-enabled TWT SP. For instance, in negotiating the trigger-enabled TWT SP, process 1400 may involve processor 1312 indicating one of the plurality of frequency segments as containing an RU allocation addressed to the non-AP STA.

At 1424, process 1400 may involve processor 1312 performing a first data transmission in a first frequency segment of the plurality of frequency segments prior to the TWT SP.

At 1426, process 1400 may involve processor 1312 switching to a second frequency segment of the plurality of frequency segments to perform a second data transmission on a second link during the TWT SP.

At 1428, process 1400 may involve processor 1312 switching back to the first frequency segment to perform a third data transmission on a first link after the TWT SP.

In some implementations, in indicating the one of the plurality of frequency segments as containing the RU allocation, process 1400 may involve processor 1312 indicating the one of the plurality of frequency segments by setting a respective bit of a plurality of bits in an Operating Channel Bitmap subfield in a TWT Channel field in a TWT element corresponding to the one of the plurality of frequency segments to 1.

In some implementations, a length of the TWT Channel field may be indicated by a TWT Channel Length subfield in a Control field in the TWT element. In some implementations, the length of the TWT Channel field may be either 1 byte or 2 bytes. Additionally, the TWT Channel Length subfield may be set to 0 to indicate that the length of the TWT Channel field is 1 byte. Moreover, the TWT Channel Length subfield may be set to 1 to indicate that the length of the TWT Channel field is 2 bytes.

In some implementations, in an event that the TWT Channel Length subfield is set to 1, each bit in the Operating Channel Bitmap subfield may correspond to a respective 80-MHz frequency segment in the BSS bandwidth which is a 320-MHz bandwidth.

In some implementations, each pair of bits in the Operating Channel Bitmap subfield may correspond to a respective 160-MHz frequency segment in the BSS bandwidth which is a 320-MHz bandwidth. In some implementations, either a first bit and a second bit may be both set to 1 to indicate that a primary 160-MHz frequency segment in the BSS bandwidth contains the RU allocation addressed to the non-AP STA or a third bit and a fourth bit may be both set to 1 to indicate that a secondary 160-MHz frequency segment in the BSS bandwidth contains the RU allocation addressed to the non-AP STA.

In some implementations, in indicating the one of the plurality of frequency segments as containing the RU allocation, process 1400 may further involve processor 1312 indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

Figure 15:
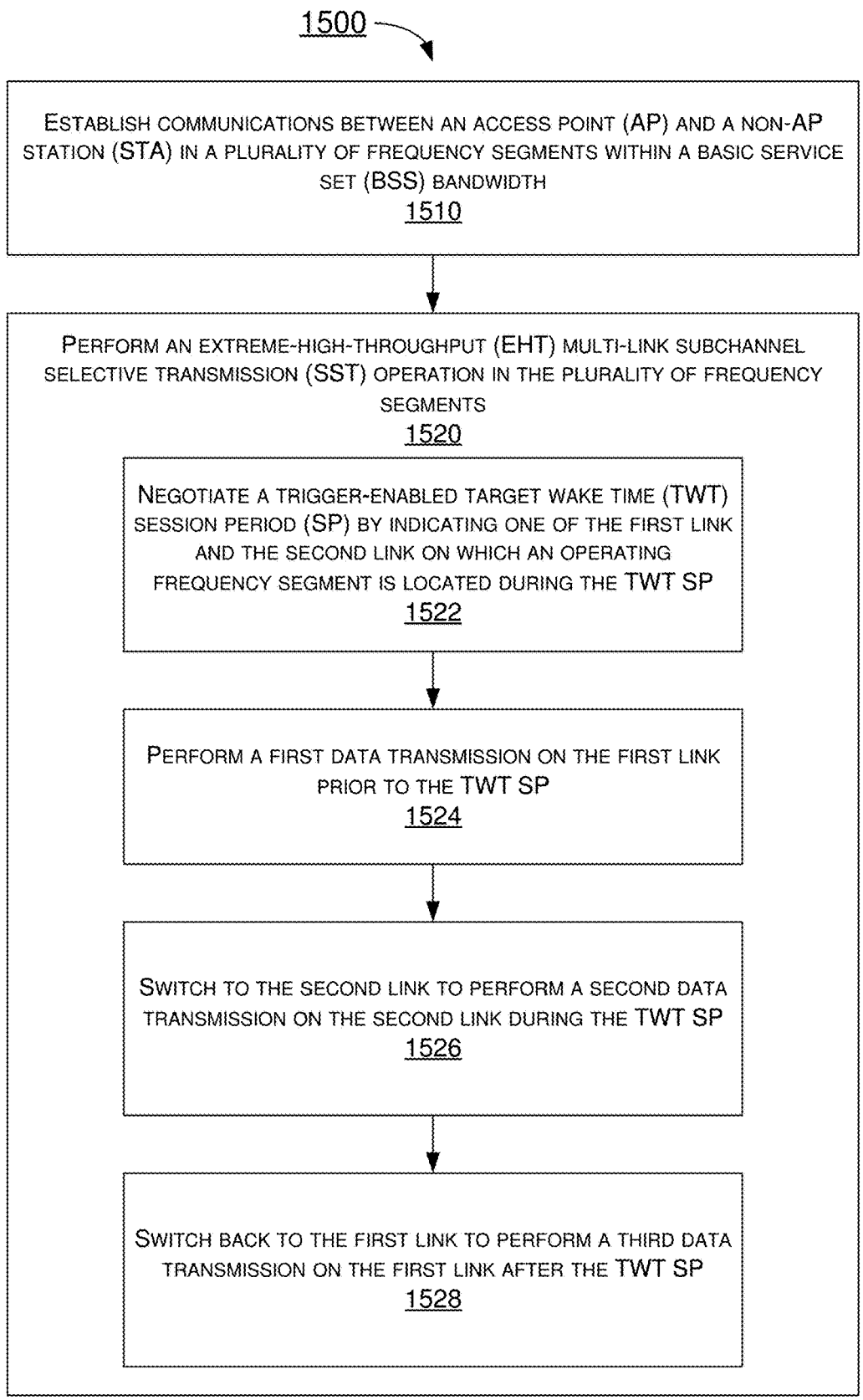
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to EHT enhanced SST operation in wireless communications in accordance with the present disclosure. Process 1500 may include one or more operations, actions, or functions as illustrated by one or more of blocks 1510 and 1520 as well as sub-blocks 1522, 1524, 1526 and 1528. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1310 and apparatus 1320 as well as any variations thereof. Solely for illustrative purposes and without limiting the scope, process 1500 is described below in the context of apparatus 1310 as STA 110 (e.g., a STA or AP) and apparatus 1320 as STA 120 (e.g., a peer STA or AP) of a wireless network such as a WLAN in accordance with one or more of IEEE 802.11 standards. Process 1500 may begin at block 1510.

At 1510, process 1500 may involve processor 1312 of apparatus 1310 establishing, via transceiver 1316, communications between an AP (e.g., STA 120) and a non-AP STA (e.g., STA 110) on at least a first link and a second link. Process 1500 may proceed from 1510 to 1520.

At 1520, process 1500 may involve processor 1312 performing, via transceiver 1316, an EHT multi-link SST operation in the plurality of frequency segments by performing certain operations represented by 1522, 1524, 1526 and 1528. It is noteworthy that, while some or all of the operations represented by 1522, 1524, 1526 and 1528 may be performed sequentially, some of the operations represented by some of 1522, 1524, 1526 and 1528 may be performed in parallel.

At 1522, process 1500 may involve processor 1322 negotiating a trigger-enabled TWT SP. For instance, in negotiating the trigger-enabled TWT SP, process 1500 may involve processor 1322 indicating one of the first link and the second link on which an operating frequency segment is located during the TWT SP.

At 1524, process 1500 may involve processor 1322 performing a first data transmission on the first link prior to the TWT SP.

At 1526, process 1500 may involve processor 1322 switching to the second link to perform a second data transmission on the second link during the TWT SP.

At 1528, process 1500 may involve processor 1322 switching back to the first link to perform a third data transmission on the first link after the TWT SP.

In some implementations, in indicating the one of the first link and the second link on which the operating frequency segment is located, process 1500 may involve processor 1322 performing certain operations. For instance, process 1500 may involve processor 1322 indicating the one of the first link and the second link by setting a respective bit of a plurality of bits in a Link ID subfield in a TWT Channel field in a TWT element corresponding to the one of the first link and the second link to 1. Moreover, process 1500 may involve processor 1322 indicating the operating frequency segment among a plurality of frequency segments within a basic service set (BSS) bandwidth by setting a respective bit of a plurality of bits in an Operating Channel Bitmap subfield in the TWT Channel field corresponding to the operating frequency segment to 1.

In some implementations, a length of the TWT Channel field may be indicated by a TWT Channel Length subfield in a Control field in the TWT element. In some implementations, the length of the TWT Channel field may be either 1 byte or 2 bytes. In some implementations, the TWT Channel Length subfield may be set to 0 to indicate that the length of the TWT Channel field is 1 byte. Moreover, the TWT Channel Length subfield may be set to 1 to indicate that the length of the TWT Channel field is 2 bytes.

In some implementations, in an event that the TWT Channel Length subfield is set to 1, each bit in the Operating Channel Bitmap subfield may correspond to a respective 80-MHz frequency segment in the BSS bandwidth which is a 320-MHz bandwidth.

In some implementations, each pair of bits in the Operating Channel Bitmap subfield may correspond to a respective 160-MHz frequency segment in the BSS bandwidth which is a 320-MHz bandwidth. In some implementations, either a first bit and a second bit may be both set to 1 to indicate that a primary 160-MHz frequency segment in the BSS bandwidth contains the RU allocation addressed to the non-AP STA or a third bit and a fourth bit may be both set to 1 to indicate that a secondary 160-MHz frequency segment in the BSS bandwidth contains the RU allocation addressed to the non-AP STA.

In some implementations, in indicating the one of the first link and the second link on which the operating frequency segment is located, process 1500 may further involve processor 1322 indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    establishing communications between an access point (AP) and a non-AP station (STA) in a plurality of frequency segments within a basic service set (BSS) bandwidth; and
    performing an extreme-high-throughput (EHT) subchannel selective transmission (SST) operation in the plurality of frequency segments by:
        negotiating a trigger-enabled target wake time (TWT) session period (SP);
        performing a first data transmission in a first frequency segment of the plurality of frequency segments prior to the TWT SP;

switching to a second frequency segment of the plurality of frequency segments to perform a second data transmission on a second link during the TWT SP; and switching back to the first frequency segment to perform a third data transmission on a first link after the TWT SP, wherein the negotiating of the TWT SP comprises indicating one of the plurality of frequency segments as containing a resource unit (RU) allocation addressed to the non-AP STA, wherein the indicating of the one of the plurality of frequency segments as containing the RU allocation comprises indicating the one of the plurality of frequency segments by setting a respective bit of a plurality of bits in an Operating Channel Bitmap subfield in a TWT Channel field in a TWT element corresponding to the one of the plurality of frequency segments to 1, wherein a length of the TWT Channel field is indicated by a TWT Channel Length subfield in a Control field in the TWT element, wherein the length of the TWT Channel field is either 1 byte or 2 bytes, wherein the TWT Channel Length subfield is set to 0 to indicate that the length of the TWT Channel field is 1 byte, and wherein the TWT Channel Length subfield is set to 1 to indicate that the length of the TWT Channel field is 2 bytes.

2. The method of claim 1, wherein, in an event that the TWT Channel Length subfield is set to 1, each bit in the Operating Channel Bitmap subfield corresponds to a respective 80-MHz frequency segment in the BSS bandwidth which is a 320-MHz bandwidth.

3. The method of claim 2, wherein each pair of bits in the Operating Channel Bitmap subfield corresponds to a respective 160-MHz frequency segment in the BSS bandwidth which is a 320-MHz bandwidth, and wherein either a first bit and a second bit are both set to 1 to indicate that a primary 160-MHz frequency segment in the BSS bandwidth contains the RU allocation addressed to the non-AP STA or a third bit and a fourth bit are both set to 1 to indicate that a secondary 160-MHz frequency segment in the BSS bandwidth contains the RU allocation addressed to the non-AP STA.

4. The method of claim 1, wherein the indicating of the one of the plurality of frequency segments as containing the RU allocation further comprises indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

5. A method, comprising:
establishing communications between an access point (AP) and a non-AP station (STA) on at least a first link and a second link; and
performing an extreme-high-throughput (EHT) multi-link subchannel selective transmission (SST) operation on the first link and the second link by:
negotiating a trigger-enabled target wake time (TWT) session period (SP);
performing a first data transmission on the first link prior to the TWT SP;
switching to the second link to perform a second data transmission on the second link during the TWT SP; and
switching back to the first link to perform a third data transmission on the first link after the TWT SP, wherein the negotiating of the TWT SP comprises indicating one of the first link and the second link on which an operating frequency segment is located during the TWT SP, wherein the indicating of the one of the first link and the second link on which the operating frequency segment is located comprises:
indicating the one of the first link and the second link by setting a respective bit of a plurality of bits in a Link identifier (ID) subfield in a TWT Channel field in a TWT element corresponding to the one of the first link and the second link to 1; and
indicating the operating frequency segment among a plurality of frequency segments within a basic service set (BSS) bandwidth by setting a respective bit of a plurality of bits in an Operating Channel Bitmap subfield in the TWT Channel field corresponding to the operating frequency segment to 1.

6. The method of claim 5, wherein a length of the TWT Channel field is indicated by a TWT Channel Length subfield in a Control field in the TWT element, wherein the length of the TWT Channel field is either 1 byte or 2 bytes, wherein the TWT Channel Length subfield is set to 0 to indicate that the length of the TWT Channel field is 1 byte, and wherein the TWT Channel Length subfield is set to 1 to indicate that the length of the TWT Channel field is 2 bytes.

7. The method of claim 6, wherein, in an event that the TWT Channel Length subfield is set to 1, each bit in the Operating Channel Bitmap subfield corresponds to a respective 80-MHz frequency segment in the BSS bandwidth which is a 320-MHz bandwidth.

8. The method of claim 7, wherein each pair of bits in the Operating Channel Bitmap subfield corresponds to a respective 160-MHz frequency segment in the BSS bandwidth which is a 320-MHz bandwidth, and wherein either a first bit and a second bit are both set to 1 to indicate that a primary 160-MHz frequency segment in the BSS bandwidth contains the RU allocation addressed to the non-AP STA or a third bit and a fourth bit are both set to 1 to indicate that a secondary 160-MHz frequency segment in the BSS bandwidth contains the RU allocation addressed to the non-AP STA.

9. The method of claim 5, wherein the indicating of the one of the first link and the second link on which the operating frequency segment is located further comprises indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

10. An apparatus, comprising:
a transceiver configured to communicate wirelessly; and
a processor coupled to the transceiver and configured to perform operations comprising:
establishing, via the transceiver, communications between an access point (AP) and a non-AP station (STA) in a plurality of frequency segments within a basic service set (BSS) bandwidth or on at least a first link and a second link; and
performing, via the transceiver, an extreme-high-throughput (EHT) subchannel selective transmission (SST) operation in the plurality of frequency segments or on the first link and the second link by:
negotiating a trigger-enabled target wake time (TWT) session period (SP);
performing a first data transmission in a first frequency segment of the plurality of frequency segments or on the first link prior to the TWT SP;
switching to a second frequency segment of the plurality of frequency segments or the second link to perform a second data transmission on the second link during the TWT SP; and
switching back to the first frequency segment or the first link to perform a third data transmission on the first link after the TWT SP,
wherein the negotiating of the TWT SP comprises either:
indicating one of the plurality of frequency segments as containing a resource unit (RU) allocation addressed to the non-AP STA; or
indicating one of the first link and the second link on which an operating frequency segment is located during the TWT SP,
wherein, in indicating the one of the first link and the second link on which the operating frequency segment is located, the processor performs operations comprising:
indicating the one of the first link and the second link by setting a respective bit of a plurality of bits in a Link identifier (ID) subfield in a TWT Channel field in a TWT element corresponding to the one of the first link and the second link to 1;
indicating the operating frequency segment among a plurality of frequency segments within a basic service set (BSS) bandwidth by setting a respective bit of a plurality of bits in an Operating Channel Bitmap subfield in the TWT Channel field corresponding to the operating frequency segment to 1; and
indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

11. The apparatus of claim 10, wherein, in indicating the one of the plurality of frequency segments as containing the RU allocation, the processor performs operations comprising:
indicating the one of the plurality of frequency segments by setting a respective bit of a plurality of bits in an Operating Channel Bitmap subfield in a TWT Channel field in a TWT element corresponding to the one of the plurality of frequency segments to 1; and
indicating a packet detection channel of the non-AP STA during the TWT SP by setting a respective bit of a plurality of bits in a Packet Detection Channel Bitmap subfield in the TWT Channel field corresponding to a 20-MHz operating channel in one of the plurality of frequency segments to 1 such that packet detection is performed by the non-AP STA in the 20-MHz operating channel.

12. The apparatus of claim 11, wherein a length of the TWT Channel field is indicated by a TWT Channel Length subfield in a Control field in the TWT element, wherein the length of the TWT Channel field is either 1 byte or 2 bytes, wherein the TWT Channel Length subfield is set to 0 to indicate that the length of the TWT Channel field is 1 byte, wherein the TWT Channel Length subfield is set to 1 to indicate that the length of the TWT Channel field is 2 bytes, wherein, in an event that the TWT Channel Length subfield is set to 1, each bit in the Operating Channel Bitmap subfield corresponds to a respective 80-MHz frequency segment in the BSS bandwidth which is a 320-MHz bandwidth, wherein each pair of bits in the Operating Channel Bitmap subfield corresponds to a respective 160-MHz frequency segment in the BSS bandwidth which is a 320-MHz bandwidth, and wherein either a first bit and a second bit are both set to 1 to indicate that a primary 160-MHz frequency segment in the BSS bandwidth contains the RU allocation addressed to the non-AP STA or a third bit and a fourth bit are both set to 1 to indicate that a secondary 160-MHz frequency segment in the BSS bandwidth contains the RU allocation addressed to the non-AP STA.

13. The apparatus of claim 10, wherein a length of the TWT Channel field is indicated by a TWT Channel Length subfield in a Control field in the TWT element, wherein the length of the TWT Channel field is either 1 byte or 2 bytes, wherein the TWT Channel Length subfield is set to 0 to indicate that the length of the TWT Channel field is 1 byte, wherein the TWT Channel Length subfield is set to 1 to indicate that the length of the TWT Channel field is 2 bytes, wherein, in an event that the TWT Channel Length subfield is set to 1, each bit in the Operating Channel Bitmap subfield corresponds to a respective 80-MHz frequency segment in the BSS bandwidth which is a 320-MHz bandwidth, wherein each pair of bits in the Operating Channel Bitmap subfield corresponds to a respective 160-MHz frequency segment in the BSS bandwidth which is a 320-MHz bandwidth, and wherein either a first bit and a second bit are both set to 1 to indicate that a primary 160-MHz frequency segment in the BSS bandwidth contains the RU allocation addressed to the non-AP STA or a third bit and a fourth bit are both set to 1 to indicate that a secondary 160-MHz frequency segment in the BSS bandwidth contains the RU allocation addressed to the non-AP STA.

14. The apparatus of claim 10, wherein, in performing the EHT SST operation, the processor performs, as the non-AP STA, operations comprising:
exchanging a request-to-send (RTS) frame and a clear-to-send (CTS) frame on the first link for a first STA in the non-AP STA;
switching a second receive (Rx) chain of a second STA in the non-AP STA from the second link to the first link;
receiving an aggregated medium access control (MAC) protocol data unit (A-MPDU) on the first link for the first STA;
transmitting an acknowledgement (ACK) responsive to the receiving of the A-MPDU on the first link for the first STA; and
switching a first Rx chain of the first STA from the first link to the second link after transmitting the ACK.

15. The apparatus of claim 10, wherein, in performing the EHT SST operation, the processor performs, as the non-AP STA and during the TWT SP, operations comprising:
exchanging a multi-user (MU) request-to-send (RTS) frame and a clear-to-send (CTS) frame on the second link for a first STA in the non-AP STA;
switching a second receive (Rx) chain of a second STA in the non-AP STA from the first link to the second link;
receiving an aggregated medium access control (MAC) protocol data unit (A-MPDU) on the second link for the first STA; and transmitting an acknowledgement (ACK) responsive to the receiving of the A-MPDU on the second link for the first STA.

16. The apparatus of claim 10, wherein, in performing the EHT SST operation, the processor performs, as the non-AP STA and during the TWT SP, operations comprising:

receiving a respective Buffer Status Report Poll (BSRP) Trigger frame in each of a primary 160-MHz frequency segment and a secondary 160-MHz frequency segment on the second link for a first STA in the non-AP STA;

transmitting a respective trigger-based (TB) Physical Layer Convergence Protocol (PLCP) Protocol Data Unit (PPDU) in each of the primary 160-MHz frequency segment and the secondary 160-MHz frequency segment on the second link for the first STA;

switching a second receive (Rx) chain of a second STA in the non-AP STA from the first link to the second link;

receiving a respective aggregated medium access control (MAC) protocol data unit (A-MPDU) in each of the primary 160-MHz frequency segment and the secondary 160-MHz frequency segment on the second link for the first STA; and transmitting a respective acknowledgement (ACK) responsive to the receiving of the A-MPDU in each of the primary 160-MHz frequency segment and the secondary 160-MHz frequency segment on the second link for the first STA.

* * * * *